US007938088B2

(12) United States Patent
Mashiki et al.

(10) Patent No.: US 7,938,088 B2
(45) Date of Patent: May 10, 2011

(54) VARIABLE VALVE TIMING SYSTEM

(75) Inventors: Zenichiro Mashiki, Nissin (JP);
Yasumichi Inoue, Toyota (JP); Noboru Takagi, Toyota (JP); Haruyuki Urushihata, Chiryu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 447 days.

(21) Appl. No.: 12/159,987

(22) PCT Filed: Aug. 29, 2007

(86) PCT No.: PCT/IB2007/002488
§ 371 (c)(1),
(2), (4) Date: Jul. 3, 2008

(87) PCT Pub. No.: WO2008/026043
PCT Pub. Date: Mar. 6, 2008

(65) Prior Publication Data
US 2009/0101094 A1    Apr. 23, 2009

(30) Foreign Application Priority Data

Aug. 31, 2006    (JP) .................. 2006-235908

(51) Int. Cl.
F01L 1/34    (2006.01)
(52) U.S. Cl. ............... 123/90.15; 123/90.11; 123/90.16; 123/90.17
(58) Field of Classification Search ............... 123/90.15, 123/90.16, 90.17, 90.18, 90.11; 251/129.01
See application file for complete search history.

(56) References Cited

U.S. PATENT DOCUMENTS

| 5,184,578 | A | 2/1993 | Quinn, Jr. et al. |
| 7,146,944 | B2 * | 12/2006 | Tani et al. .................. 123/90.15 |
| 2002/0066425 | A1 | 6/2002 | Schaefer |
| 2005/0081808 | A1 | 4/2005 | Tani et al. |

FOREIGN PATENT DOCUMENTS

| DE | 42 32 836 | 9/1993 |
| JP | 2 267344 | 11/1990 |
| JP | 8 114168 | 5/1996 |
| JP | 2002-161763 | 6/2002 |
| JP | 2004-156461 | 6/2004 |
| JP | 2005 120874 | 5/2005 |
| JP | 2006 170011 | 6/2006 |
| WO | 01 27478 | 4/2001 |

OTHER PUBLICATIONS

Japanese Office Action issued Sep. 21, 2010, in Patent Application No. 2006-235908 (with English-language translation).

* cited by examiner

Primary Examiner — Ching Chang
(74) Attorney, Agent, or Firm — Oblon, Spivak, McClelland, Maier & Neustadt, L.L.P.

(57) ABSTRACT

An ECU transmits a pulsed operation command signal, indicating operation commands for an electric motor used as a VVT actuator, to an electric-motor EDU. The electric-motor EDU recognizes the combination of the direction in which the actuator should be operated (actuator operation direction) and the control mode based on the duty ratio of the operation command signal, and the rotational speed command value based on the frequency of the operation command signal. The electric-motor EDU controls the electric motor according to the control commands. The duty ratio indicating the combination is set such that even if the duty ratio is falsely recognized, a false recognition concerning the actuator operation direction is prevented, such false recognition causing the valve phase to change in an undesirable direction, and even if the actuator operation direction is falsely recognized, the rate of change in the phase is restricted.

8 Claims, 15 Drawing Sheets

FIG.17

| ROTATIONAL DIRECTION<br>CONTROL MODE | FORWARD DIRECTION | REVERSE DIRECTION |
|---|---|---|
| ROTATIONAL SPEED CONTROL MODE | (DT1)<br>10% | (DT4)<br>90% |
| CONSTANT ELECTRIC POWER CONTROL MODE | (DT2)<br>35% | (DT3)<br>65% |

VARIABLE VALVE TIMING SYSTEM

BACKGROUND OF THE INVENTION

1. Field of the Invention

The invention relates generally to a variable valve timing system, and, more specifically, to a variable valve timing system that changes the opening/closing timing of a valve by an amount of change corresponding to the operation amount of an actuator.

2. Description of the Related Art

A variable valve timing (VVT) system that changes the phase (i.e., crank angle), at which an intake valve or an exhaust valve is opened/closed, based on the engine operating state has been used. Such variable valve timing system changes the phase of the intake valve or the exhaust valve by rotating a camshaft, which opens/closes the intake valve or the exhaust valve, relative to, for example, a sprocket. The camshaft is rotated hydraulically or by means of an actuator, for example, an electric motor.

For example, Japanese Patent Application Publication No. 2005-120874 (JP-A-2005-120874) describes a valve timing adjustment device that adjusts the valve timing of a valve provided in an engine using a rotary torque produced by an electric motor. The valve timing adjustment device sets a target amount of change in the rotational speed of the electric motor based on the deviation of the actual phase, which is determined based on the rotational speed of a crankshaft and the rotational speed of a camshaft, from the target phase set based on the operating state of the engine. The target amount of change corresponds to the rate of phase change, and the electricity passing through the electric motor is controlled by a drive circuit that receives a control signal indicating the target amount of change in the rotational speed of the electric motor. Japanese Patent Application Publication No. 2005-120874 (JP-A-2005-120874) describes a configuration in which a control circuit produces a control signal having a frequency proportional to the target rotational speed for an electric motor, and a drive circuit controls the electric power supplied to the electric motor based on the control signal from the control circuit (i.e., the inverter control is executed).

A method for transmitting the information between two circuits is described in Japanese Patent Application Publication No. 08-114168 (JP-A-08-114168). JP-A-08-114168 describes the method for transmitting a signal between a knock sensor for an engine and an ECU. According to the method, on the knock sensor side, a result of knock determination made based on the amount of knocking is encoded and the value of the signal, which contains the determination result and which is transmitted through an output signal line, is changed at TDC and the gate close timing. Then, on the ECU side, the value of the signal transmitted through the output signal line is read at two timings and decoded. Thus, the result of knocking determination is reconstructed. With this configuration, a maximum of four determinations, and not only whether knocking has occurred but also the magnitude of the knocking, if the knocking has occurred, are transmitted by the value of only one signal that is transmitted through the output signal line. Also, on the ECU side, the input signal line is reversed, and the TDC is transmitted to the knock sensor. Thus, not only TDC but also the information concerning cylinders is transmitted through only one input signal line.

Japanese Patent Application Publication No. 02-267344 (JP-A-02-267344) describes a configuration in which a power module that drives multiple actuators using multiple drive circuits based on control signals from an electronic control unit is provided, and the information is transmitted from the power module to the electronic control unit through only one signal line by modulating the result of monitoring of the operating states of the drive circuits.

In the variable valve timing systems described above, multiple control modes for an actuator (for example, an electric motor) are usually prepared in order to control the actuator more efficiently. For example, in addition to the forward mode in which the response of the phase to the phase control is maintained at a sufficient level, the special mode may be prepared to protect devices from malfunctioning. In the special mode, the operation of the actuator is controlled based on, for example, the limit position of the range in which the valve phase can be mechanically changed. The valve phase needs to be controlled to be advanced and delayed. Accordingly, the direction in which the actuator should be operated (for example, the direction in which the electric motor should be rotated) needs to be instructed as well.

Accordingly, in the variable valve timing system, control signals that indicate the operation commands for the actuator (the operation amount, the direction in which the actuator should be operated, the control mode, etc.) need to be transmitted from a control unit that sets the operation commands based on the status of the valve phase control to a drive unit that controls the actuator.

In this case, the manner in which the above-mentioned operation command items are indicated by the control signals needs to be set such that, even when the drive unit falsely recognizes the control signal, the negative influence on the control is minimized. In addition, preferably, one control signal contains many operation commands in order to reduce the number of signal lines required.

SUMMARY OF THE INVENTION

The invention provides a variable valve timing system which executes the valve timing control more stably by appropriately setting a control signal that indicates operation commands for an actuator.

An aspect of the invention relates to a variable valve timing system that changes opening/closing timing of at least one of an intake valve and an exhaust valve provided in an engine. The variable valve timing system includes a changing mechanism, a control unit, and a drive control unit. An actuator is driven in a control mode selected from multiple control modes. The changing mechanism is structured to change the opening/closing timing of the intake valve or the exhaust valve by an amount of change corresponding to the operation amount of the actuator. The control unit prepares operation commands for the actuator based on the current value of the opening/closing timing, and prepares a pulsed operation command signal which indicates, among the prepared operation commands, at least both which operating direction the actuator should be operated and the selected control mode. The drive control unit receives the operation command signal from the control unit, and controls the actuator in accordance with the operation commands prepared by the control unit. The control unit sets the duty ratio of the pulsed operation command signal to the predetermined value assigned to a corresponding one of the multiple combinations of the operating direction and the selected control mode. The multiple combinations are assigned with different predetermined values. In addition, the predetermined values assigned to the corresponding multiple combinations of the multiple control modes and one of the operating directions are higher than the boundary value, and the predetermined values assigned to the corresponding multiple combinations of the multiple control modes and the other operating direction are lower than the boundary value. In addition, among the predetermined values corresponding to each of the operating directions, the difference between the boundary value and the predetermined value, which is assigned to one of the control modes is larger than the difference between the boundary value and the predetermined value, which is assigned to another one of the control modes in which the rate of change in the opening/closing timing is low than that in the one of the control modes.

With the variable valve timing system according to the first aspect of the invention, the duty ratio of the operation command signal, which indicates the control mode and the operating direction in which the actuator should be operated, is set on one of the higher side or the lower side with respect to the boundary value based on the operating direction. In addition, the duty ratio close to the boundary value indicates, in each of the operating directions, the control mode in which the rate of change in the opening/closing timing is relatively low. Accordingly, even when the drive control unit falsely recognizes the duty ratio of the operation command signal, a false recognition concerning the operating direction is prevented. Such false recognition may cause the opening/closing timing to change in an undesirable direction. Even if the operating direction is falsely recognized, the rate of change in the opening/closing timing is restricted. The control signal contains multiple operation command items. In addition, the operation command signal for the actuator is appropriately set such that, even when the duty ratio of the control signal is falsely recognized, the negative influence on the valve timing control is minimized. In this way, the valve timing control is executed more stably.

In the first aspect of the invention, the difference between the predetermined value, which is closest to the boundary value from among the predetermined value that are higher than the boundary value, and the predetermined value, which is closest to the boundary value from among the predetermined values that are lower than the boundary value, is larger than the difference between the predetermined values that are adjacent to each other when the predetermined values, which correspond to each of the operating directions and are assigned to the corresponding multiple control modes, are sorted in ascending order.

Thus, the effect of preventing the drive control unit from falsely recognizing the direction in which the actuator should be operated is enhanced.

In the first aspect of the invention, an electric motor may be used as the actuator, the operation amount of the actuator may be the rotational speed of the electric motor relative to the rotational speed of a camshaft that drives the valve of which the opening/closing timing is changed, and the direction in which the actuator should be operated may be the direction in which the electric motor should be rotated. In addition, the multiple control modes may include a first control mode in which the rotational speed control over the electric motor is executed, and a second control mode in which electric power supplied to the electric motor is fixed in order to restrict the rate of change in the opening/closing timing. In the case in which a command to rotate the electric motor in a forward direction is issued, the duty ratio may be set to a first value when the first control mode is selected, and the duty ratio may be set to a second value when the second control mode is selected. In the case in which a command to rotate the electric motor in a reverse direction is issued, the duty ratio may be set to a third value when the second control mode is selected, and the duty ratio is set to a fourth value when the first control mode is selected. The difference between the first value and the boundary value may be larger than the difference between the second value and the boundary value, and the difference between the fourth value and the boundary value is larger than the difference between the third value and the boundary value.

In the first aspect of the invention, the difference between the second value and the third value may be larger than the difference between the first value and the second value, and the difference between the second value and the third value may be larger than the difference between the third value and the fourth value.

Thus, in the configuration in which the actuator is the electric motor and the control modes include the first control mode (the rotational speed control mode) in which the rotational speed control over the electric motor is executed, and the second control mode (the constant electric power control mode) in which the electric power supplied to the electric motor is fixed, the same effects as those produced by the variable valve timing system described above can be obtained.

In the first aspect of the invention, the operation command signal may indicate the operation amount of the actuator in addition to the direction in which the actuator should be operated and the selected control mode. The control unit may set the frequency of the pulsed operation command signal in accordance with the operation amount command value for the actuator, based on the predetermined relationship between the operation amount of the actuator and the frequency of the pulsed operation command signal.

With this configuration, the actuator operation amount command value is transmitted from the control unit to the drive control unit without increasing the operation command signals.

In the first aspect of the invention, an electric motor may be used as the actuator, and the operation amount of the actuator may be the rotational speed of the electric motor relative to the rotational speed of a camshaft that drives the valve of which the opening/closing timing is changed. The control unit may set the frequency of the pulsed operation command signal in accordance with the rotational speed command value for the electric motor, based on the predetermined relationship between the rotational speed of the electric motor and the frequency of the pulsed operation command signal.

Thus, in the configuration in which the actuator is the electric motor and the valve timing is changed by controlling the rotational speed of the electric motor, the rotational speed command value is transmitted from the control unit to the drive control unit without increasing the operation command signals.

With the variable valve timing system according to the first aspect of the invention, the valve timing control is executed more stably, because the control signal contains multiple operation command items and the operation command signal for the actuator is appropriately set such that, even when the duty ratio of the control signal is falsely recognized, the negative influence on the valve timing control is minimized.

BRIEF DESCRIPTION OF THE DRAWINGS

The foregoing and further objects, features and advantages of the invention will become apparent from the following description of an embodiment with reference to the accompanying drawings, wherein the same or corresponding portions will be denoted by the same reference numerals and wherein:

FIG. 17 is a table illustrating the relationship between the duty ratios of the operation command signal in FIG. 16 and the operation commands for the electric motor.

DETAILED DESCRIPTION OF THE EMBODIMENT

Figure 1:
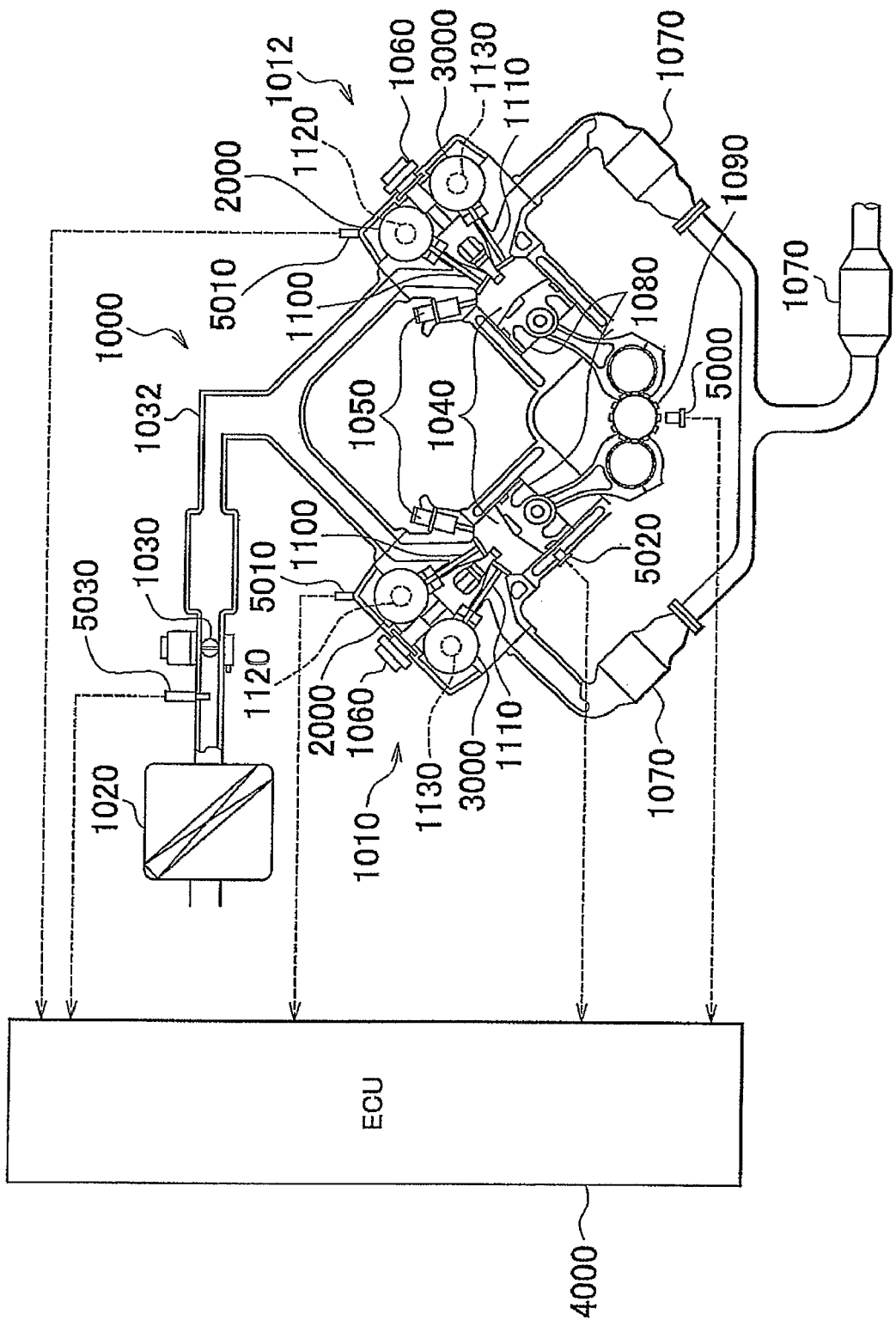
FIG. 1 is a view schematically showing the structure of a vehicle engine provided with a variable valve timing system according to an embodiment of the invention.

Hereafter, an embodiment of the invention will be described with reference to the accompanying drawings. In the following description, the same or corresponding elements will be denoted by the same reference numerals. The names and functions of the elements having the same reference numerals are also the same. Accordingly, the descriptions concerning the elements having the same reference numerals will be provided only once below.

First, a vehicle engine provided with a variable valve timing system according to the embodiment of the invention will be described with reference to FIG. 1.

An engine 1000 is an eight-cylinder V-type engine including a first bank 1010 and a second bank 1012 each of which has four cylinders therein. Note that, the variable valve timing system according to the embodiment of the invention may be applied to any types of engines. Namely, the variable valve timing system may be applied to engines other than an eight-cylinder V-type engine.

Air that has passed through an air cleaner 1020 is supplied to the engine 1000. A throttle valve 1030 adjusts the amount of air supplied to the engine 1000. The throttle valve 1030 is an electronically-controlled throttle valve that is driven by a motor.

The air is introduced into a cylinder 1040 through an intake passage 1032. The air is then mixed with fuel in a combustion chamber formed within the cylinder 1040. The fuel is injected from an injector 1050 directly into the cylinder 1040. Namely, the injection hole of the injector 1050 is positioned within the cylinder 1040.

The fuel is injected into the cylinder 1040 in the intake stroke. The time at which the fuel is injected need not be in the intake stroke. The description concerning the embodiment of the invention will be provided on the assumption that the engine 1000 is a direct-injection engine where the injection hole of the injector 1050 is positioned within the cylinder 1040. In addition to the injector 1050 for direct-injection, an injector for port-injection may be provided. Alternatively, only an injector for port-injection may be provided.

The air-fuel mixture in the cylinder 1040 is ignited by a spark plug 1060, and then burned. The burned air-fuel mixture, namely, the exhaust gas is purified by a three-way catalyst 1070, and then discharged to the outside of the vehicle. A piston 1080 is pushed down due to combustion of the air-fuel mixture, whereby a crankshaft 1090 is rotated.

An intake valve 1100 and an exhaust valve 1110 are provided on the top of the cylinder 1040. The intake valve 1100 is driven by an intake camshaft 1120, and the exhaust valve 1110 is driven by an exhaust camshaft 1130. The intake camshaft 1120 and the exhaust camshaft 1130 are connected to each other by, for example, a chain or a gear, and rotate at the same number of revolutions (at one-half the number of revolutions of the crankshaft 1090). Because the number of revolutions (typically, the number of revolutions per minute (rpm)) of a rotating body, for example, a shaft is usually referred to as the rotational speed, the term "rotational speed" will be used in the following description.

The phase (opening/closing timing) of the intake valve 1100 is controlled by an intake VVT mechanism 2000 which is fitted to the intake camshaft 1120. The phase (opening/closing timing) of the exhaust valve 1110 is controlled by an exhaust VVT mechanism 3000 which is fitted to the exhaust camshaft 1130.

In the embodiment of the invention, the intake camshaft 1120 and the exhaust camshaft 1130 are rotated by the VVT mechanisms 2000 and 3000, respectively, whereby the phase of the intake valve 1100 and the phase of the exhaust valve 1110 are controlled. However, the method for controlling the phase is not limited to this.

Figure 3:
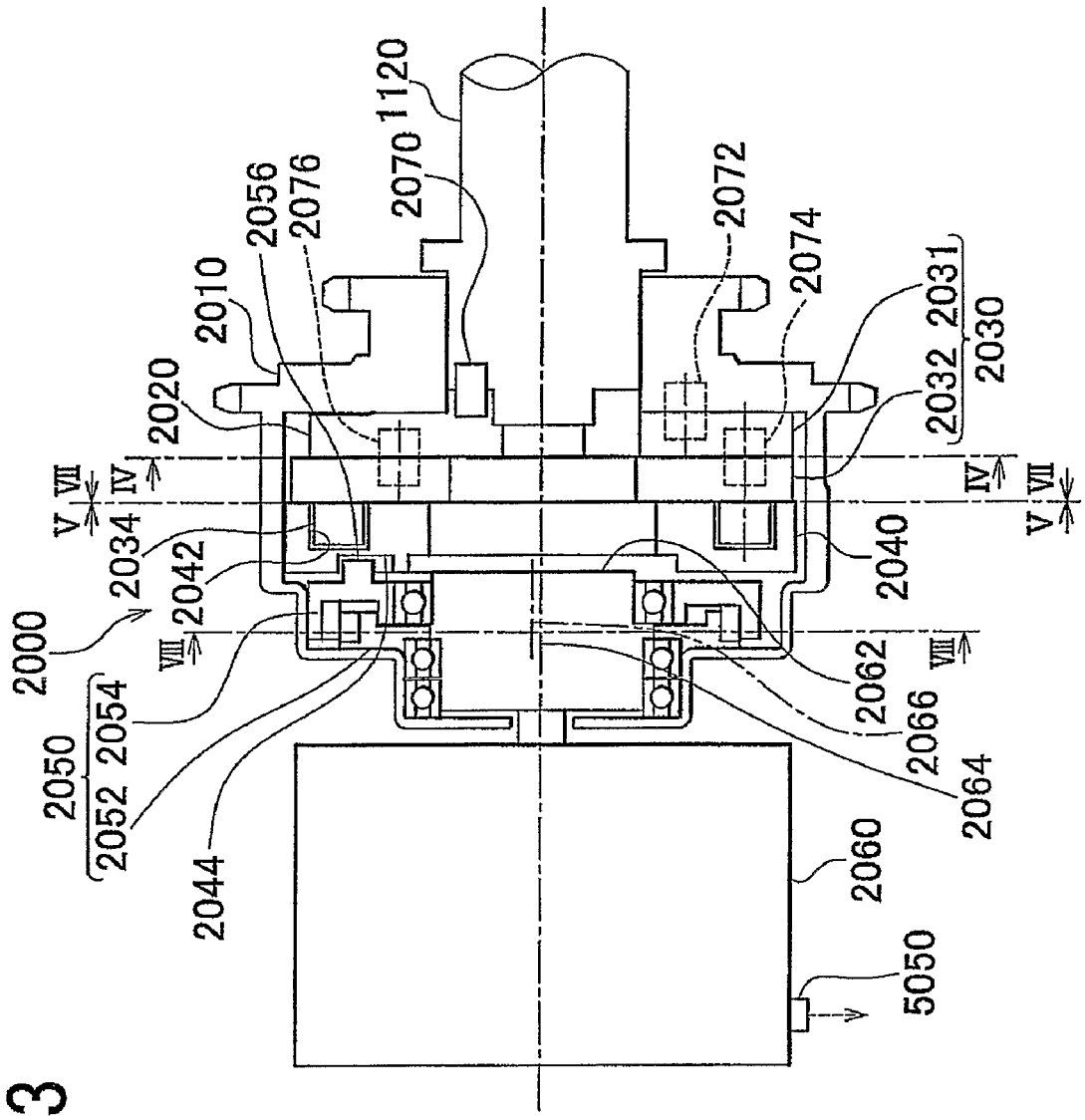
FIG. 3 is a cross-sectional view showing an intake VVT mechanism.

The intake VVT mechanism 2000 is operated by an electric motor 2060 (shown in FIG. 3). The electric motor 2060 is controlled by an electronic control unit (ECU) 4000. The magnitude of electric current passing through the electric motor 2060 is detected by an ammeter (not shown) and the voltage applied to the electric motor 2060 is detected by a voltmeter (not shown), and a signal indicating the magnitude of electric current and a signal indicating the voltage are transmitted to the ECU 4000.

The exhaust VVT mechanism 3000 is hydraulically operated. Note that, the intake VVT mechanism 2000 may be hydraulically operated. Note that, the exhaust VVT mechanism 3000 may be operated by means of an electric motor.

The ECU 4000 receives signals indicating the rotational speed and the crank angle of the crankshaft 1090, from a crank angle sensor 5000. The ECU 4000 also receives a signal indicating the phase of the intake camshaft 1120 and a signal indicating the phase of the exhaust camshaft 1130 (the positions of these camshafts in the rotational direction), from a camshaft position sensor 5010.

In addition, the ECU 4000 receives a signal indicating the temperature of a coolant for the engine 1000 (the coolant temperature) from a coolant temperature sensor 5020, and a signal, indicating the amount of air supplied to the engine 1000, from an airflow meter 5030.

The ECU 4000 controls the throttle valve opening amount, the ignition timing, the fuel injection timing, the fuel injection amount, the phase of the intake valve 1100, the phase of the exhaust valve 1110, etc. based on the signals received from the above-mentioned sensors and the maps and programs stored in memory (not shown) so that the engine 1000 is brought into the desired operating state.

Figure 2:
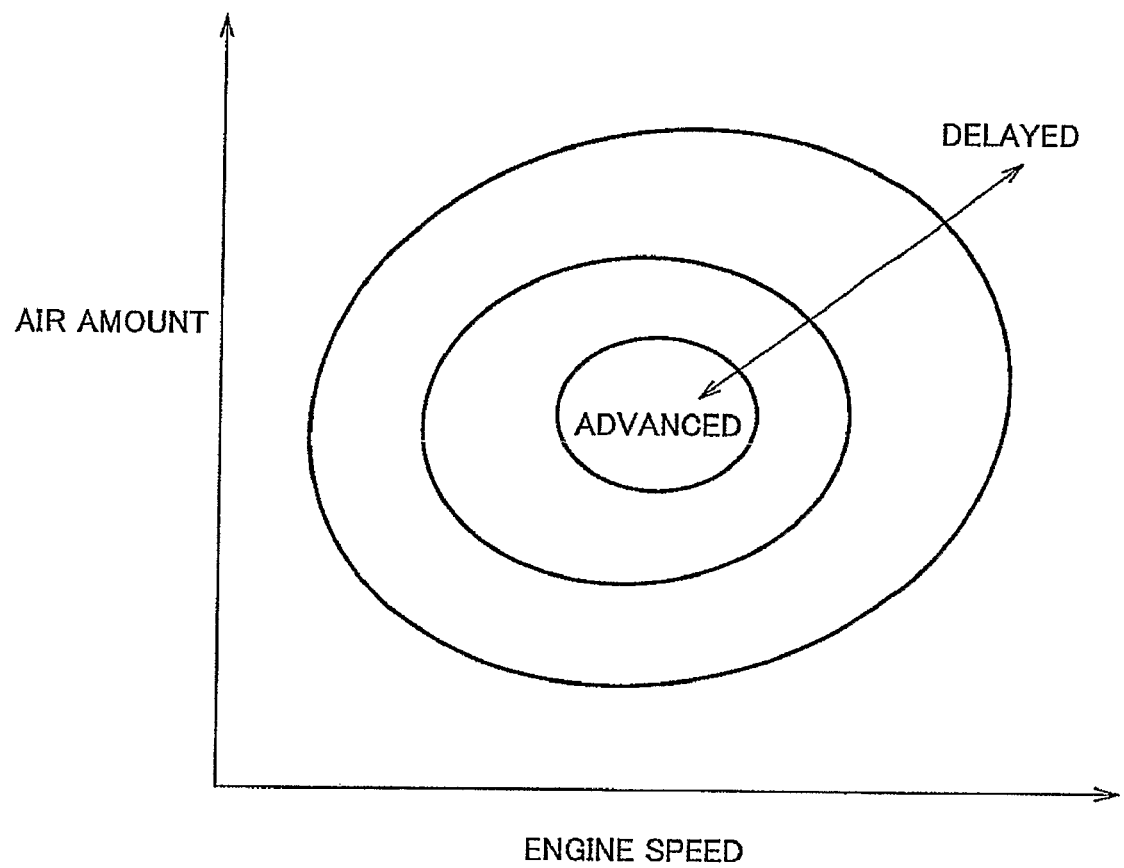
FIG. 2 is a graph showing the map that defines the phase of an intake camshaft.

According to the embodiment of the invention, the ECU 4000 successively sets the target phase of the intake valve 1100 appropriate for the current engine operating state with reference to the map that defines the target phase in advance using parameters indicating the engine operating state, typically, using the engine speed NE and the intake air amount KL, as shown in FIG. 2. Generally, multiple maps, used to set the target phase of the intake valve 1100 at multiple coolant temperatures, are stored.

Hereafter, the intake VVT mechanism 2000 will be described in more detail. Note that, the exhaust VVT mechanism 3000 may have the same structure as the intake VVT mechanism 2000 described below. Alternatively, each of the intake VVT mechanism 2000 and the exhaust VVT mechanism 3000 may have the same structure as the intake VVT mechanism 2000 described below.

As shown in FIG. 3, the intake VVT mechanism 2000 includes a sprocket 2010, a cam plate 2020, link mechanisms 2030, a guide plate 2040, a speed reducer 2050, and the electric motor 2060.

The sprocket 2010 is connected to the crankshaft 1090 via, for example, a chain. The rotational speed of the sprocket 2010 is one-half the rotational speed of the crankshaft 1090, as in the case of the intake camshaft 1120 and the exhaust camshaft 1130. The intake camshaft 1120 is provided such that the intake camshaft 1120 is coaxial with the sprocket 2010 and rotates relative to the sprocket 2010.

The cam plate 2020 is connected to the intake camshaft 1120 with a first pin 2070. In the sprocket 2010, the cam plate 2020 rotates together with the intake camshaft 1120. The cam plate 2020 and the intake camshaft 1120 may be formed integrally with each other.

Figure 4:
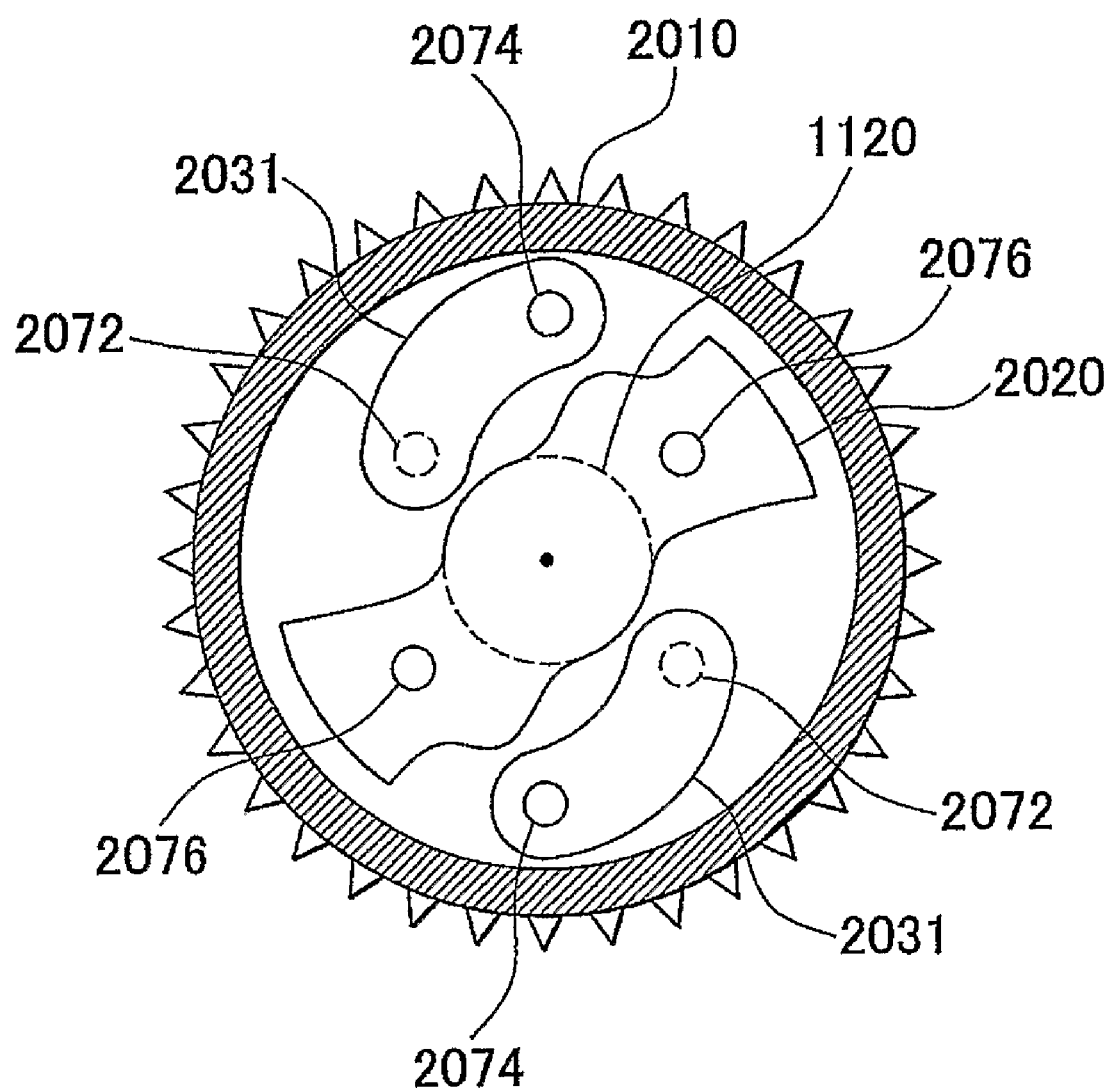
FIG. 4 is a cross-sectional view taken along the line IV-IV in FIG. 3.

Each link mechanism 2030 is formed of a first arm 2031 and a second arm 2032. As shown in FIG. 4, that is, a cross-sectional view taken along the line IV-IV in FIG. 3, paired first arms 2031 are arranged in the sprocket 2010 so as to be symmetric with respect to the axis of the camshaft 1120. Each first arm 2031 is connected to the sprocket 2010 so as to pivot about a second pin 2072.

Figure 5:
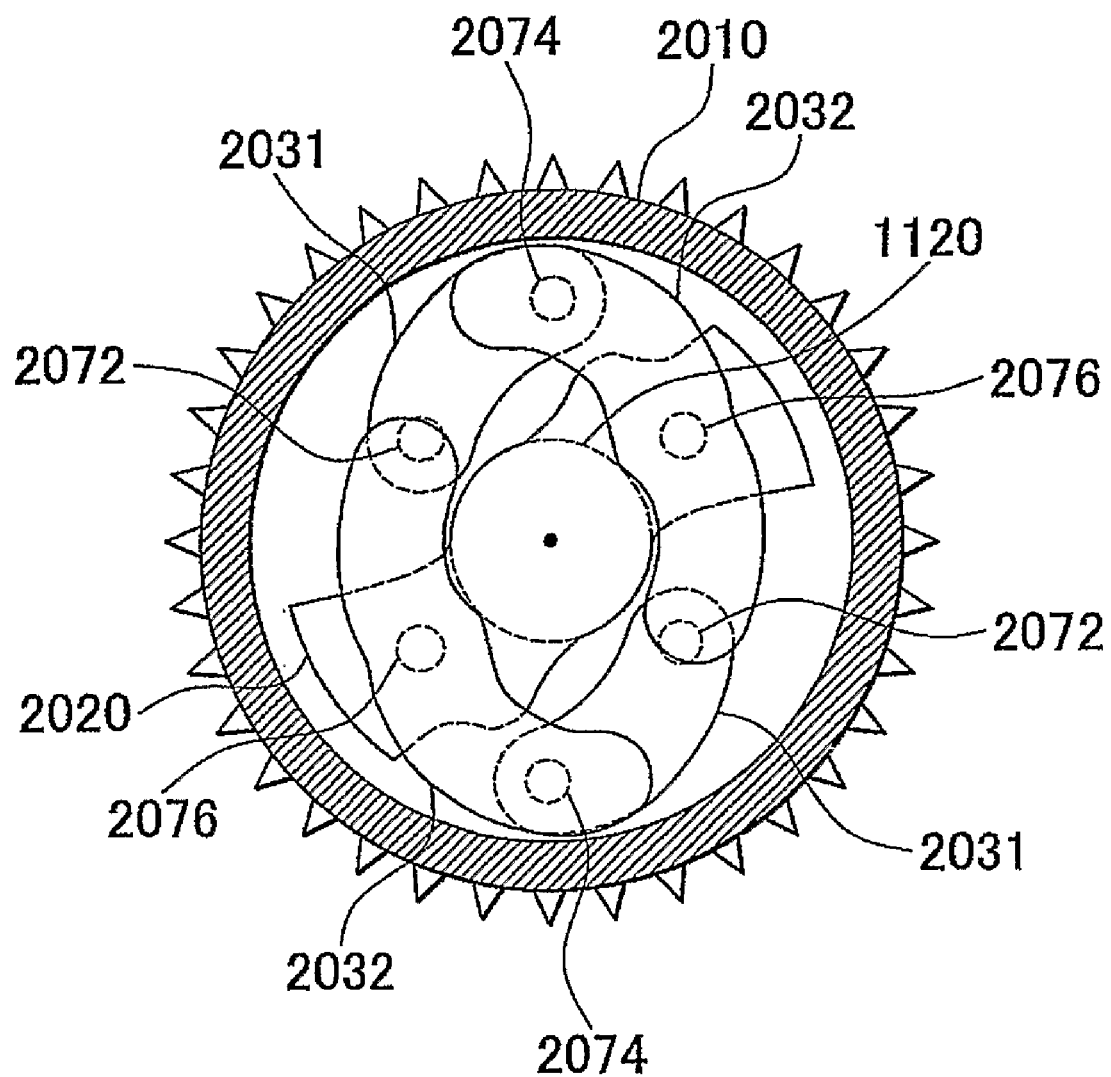
FIG. 5 is a first cross-sectional view taken along the line V-V in FIG. 3.
Figure 6:
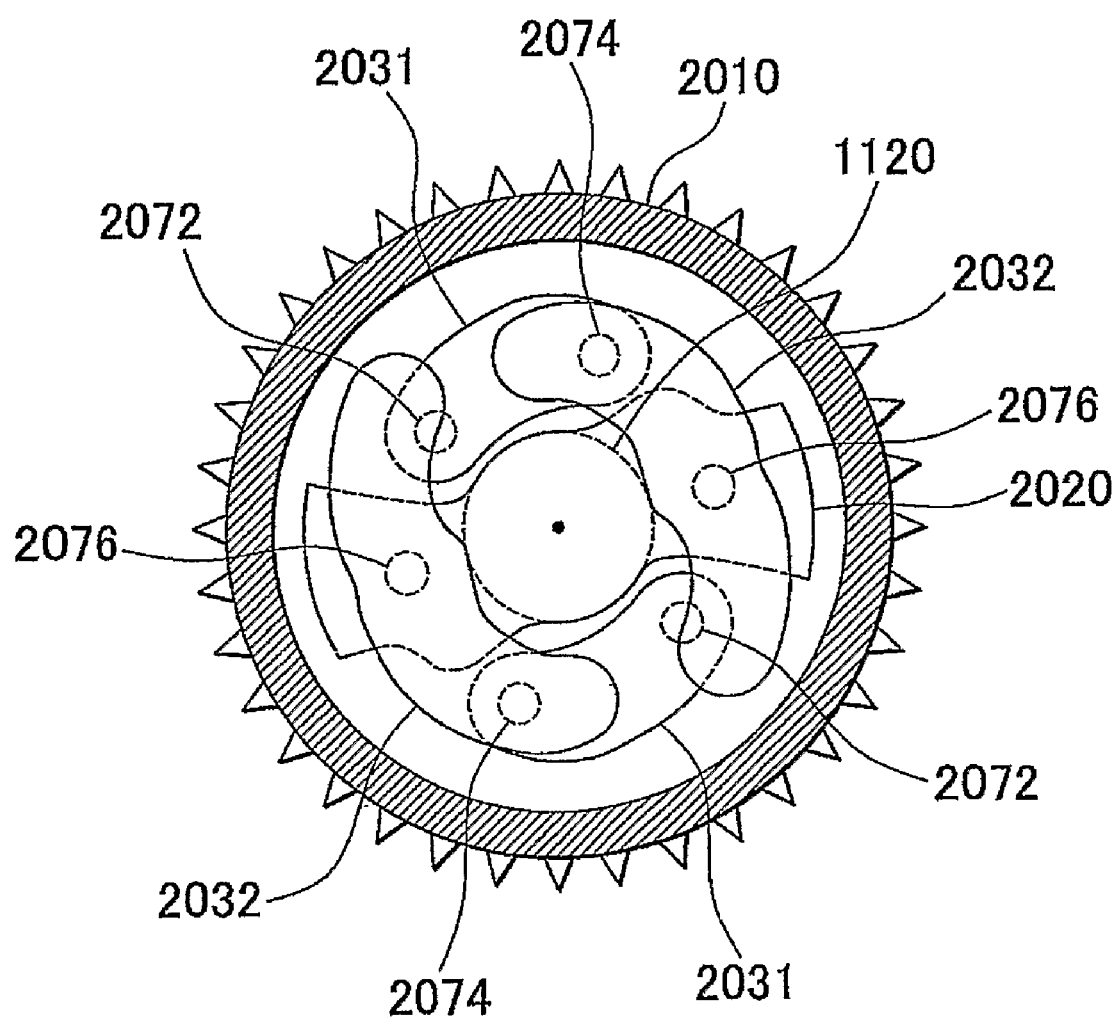
FIG. 6 is a second cross-sectional view taken along the line V-V in FIG. 3.

As shown in FIG. 5, that is, a cross-sectional view taken along the line V-V in FIG. 3, and FIG. 6 that shows the state achieved by advancing the phase of the intake valve 1100 from the state shown in FIG. 5, the first arms 2031 and the cam plate 2020 are connected to each other by the second arms 2032.

Each second arm 2032 is supported so as to pivot about a third pin 2074, with respect to the first arm 2031. Each second arm 2032 is supported so as to pivot about a fourth pin 2076, with respect to the cam plate 2020.

The intake camshaft 1120 is rotated relative to the sprocket 2010 by the pair of link mechanisms 2030, whereby the phase of the intake valve 100 is changed. Accordingly, even if one of the link mechanisms 2030 breaks and snaps, the phase of the intake valve 1100 is changed by the other link mechanism 2030.

As shown in FIG. 3, a control pin 2034 is fitted on one face of each link mechanism 2030 (more specifically, the second arm 2032), the face being proximal to the guide plate 2040. The control pin 2032 is arranged coaxially with the third pin 2074. Each control pin 2034 slides within a guide groove 2042 formed in the guide plate 2040.

Each control pin 2034 moves in the radial direction while sliding within the guide groove 2042 formed in the guide plate 2040. The movement of each control pin 2034 in the radial direction rotates the intake camshaft 1120 relative to the sprocket 2010.

Figure 7:
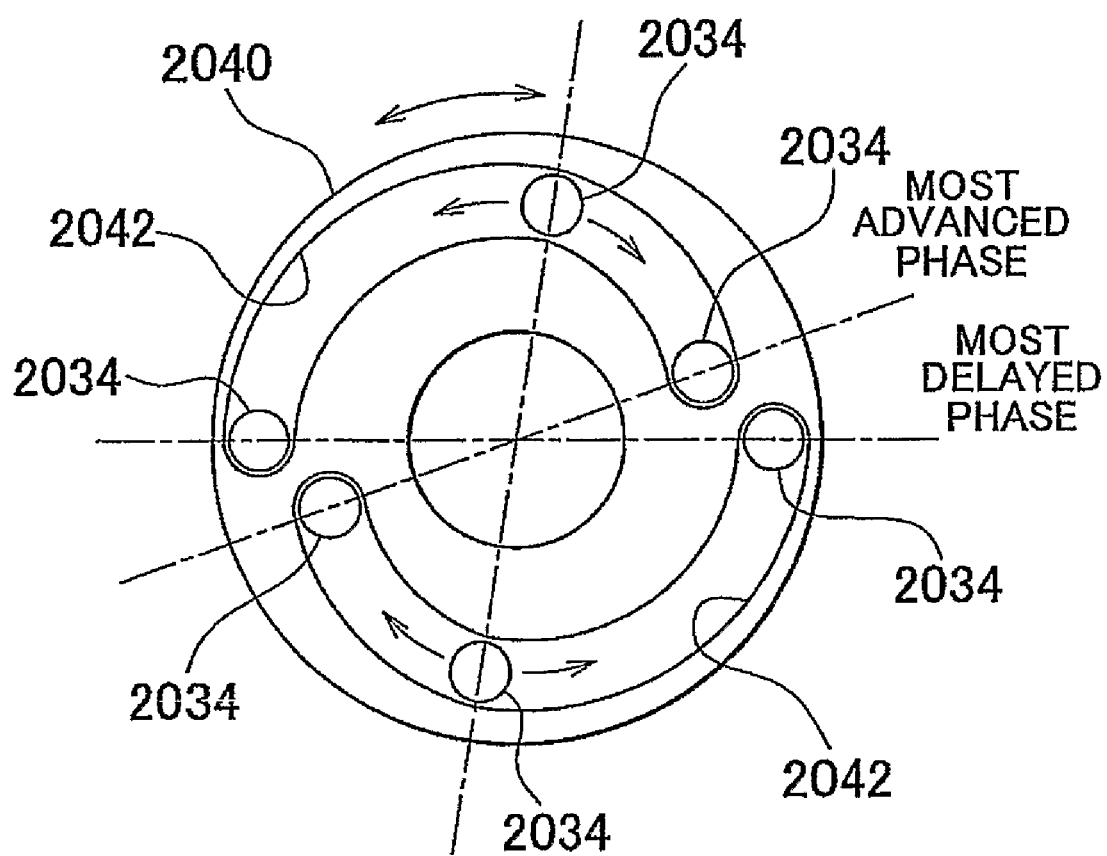
FIG. 7 is a cross-sectional view taken along the line VII-VII in FIG. 3.

As shown in FIG. 7, that is, a cross-sectional view taken along the line VII-VII in FIG. 3, the guide groove 2042 is formed in a spiral fashion such that the control pin 2034 moves in the radial direction in accordance with the rotation of the guide plate 2040. However, the shape of the guide groove 2042 is not limited to this.

As the distance between the control pin 2034 and the axis of the guide plate 2040 increases in the radial direction, the phase of the intake valve 1100 is more delayed. Namely, the amount of change in the phase corresponds to the amount by which each link mechanism 2030 is operated in accordance with the movement of the control pin 2034 in the radial direction. Note that, as the distance between the control pin 2034 and the axis of the guide plate 2040 increases in the radial direction, the phase of the intake valve 1100 may be more advanced.

As shown in FIG. 7, when the control pin 2034 reaches the end of the guide groove 2042, the operation of the link mechanism 2030 is restricted. Accordingly, the phase at which the control pin 2034 reaches the end of the guide groove 2042 is the most advanced phase or the most delayed phase of the intake valve 1100.

As shown in FIG. 3, multiple recesses 2044 are formed in one face of the guide plate 2040, the face being proximal to the speed reducer 2050. The recesses 2044 are used to connect the guide plate 2040 and the speed reducer 2050 to each other.

The speed reducer 2050 is formed of an externally-toothed gear 2052 and an internally-toothed gear 2054. The externally-toothed gear 2052 is fixed to the sprocket 2010 so as to rotate together with the sprocket 2010.

Multiple projections 2056, which are fitted in the recesses 2044 of the guide plate 2040, are formed on the internally-toothed gear 2054. The internally-toothed gear 2054 is supported so as to be rotatable about an eccentric axis 2066 of a coupling 2062 of which the axis deviates from an axis 2064 of the output shaft of the electric motor 2060.

Figure 8:
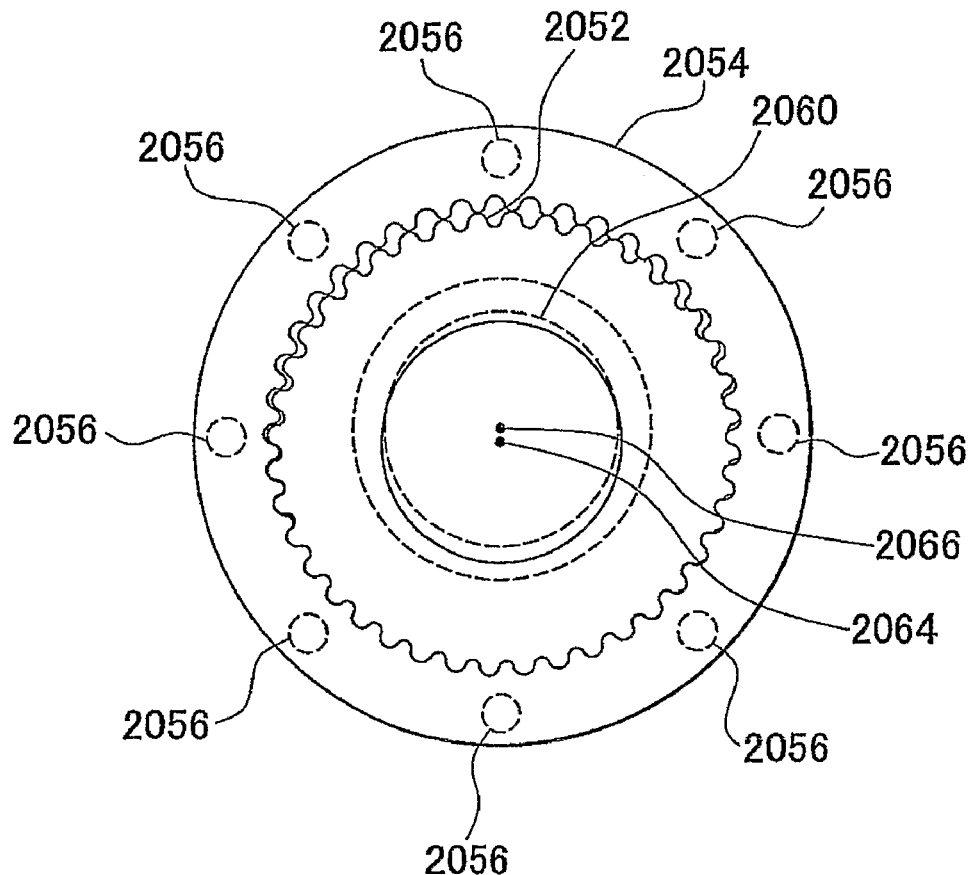
FIG. 8 is a cross-sectional view taken along the line VIII-VIII in FIG. 3.

FIG. 8 shows a cross-sectional view taken along the line VIII-VIII in FIG. 3. The internally-toothed gear 2054 is arranged such that part of the multiple teeth thereof mesh with the externally-toothed gear 2052. When the rotational speed of the output shaft of the electric motor 2060 is equal to the rotational speed of the sprocket 2010, the coupling 2062 and the internally-toothed gear 2054 rotate at the same rotational speed as the externally-toothed gear 2052 (the sprocket 2010). In this case, the guide plate 2040 rotates at the same rotational speed as the sprocket 2010, and the phase of the intake valve 1100 is maintained.

When the coupling 2062 is rotated about the axis 2064 relative to the externally-toothed gear 2052 by the electric motor 2060, the entirety of the internally-toothed gear 2054 turns around the axis 2064, and, at the same time, the internally-toothed gear 2054 rotates about the eccentric axis 2066. The rotational movement of the internally-toothed gear 2054 causes the guide plate 2040 to rotate relative to the sprocket 2010, whereby the phase of the intake valve 1100 is changed.

The phase of the intake valve 1100 is changed by reducing the relative rotational speed (the operation amount of the electric motor 2060) between the output shaft of the electric motor 2060 and the sprocket 2010 using the speed reducer 2050, the guide plate 2040 and the link mechanisms 2030. Alternatively, the phase of the intake valve 1100 may be changed by increasing the relative rotational speed between the output shaft of the electric motor 2060 and the sprocket 2010. The output shaft of the electric motor 2060 is provided with a motor rotational angle sensor 5050 that outputs a signal indicating the rotational angle (the position of the output shaft in its rotational direction) of the output shaft. Generally, the motor rotational angle sensor 5050 produces a pulse signal each time the output shaft of the electric motor 2060 is rotated by a predetermined angle. The rotational speed of the output shaft of the electric motor 2060 (hereinafter, simply referred to as the "rotational speed of the electric motor 2060" where appropriate) is detected based on the signal output from the motor rotational angle sensor 5050.

Figure 9:
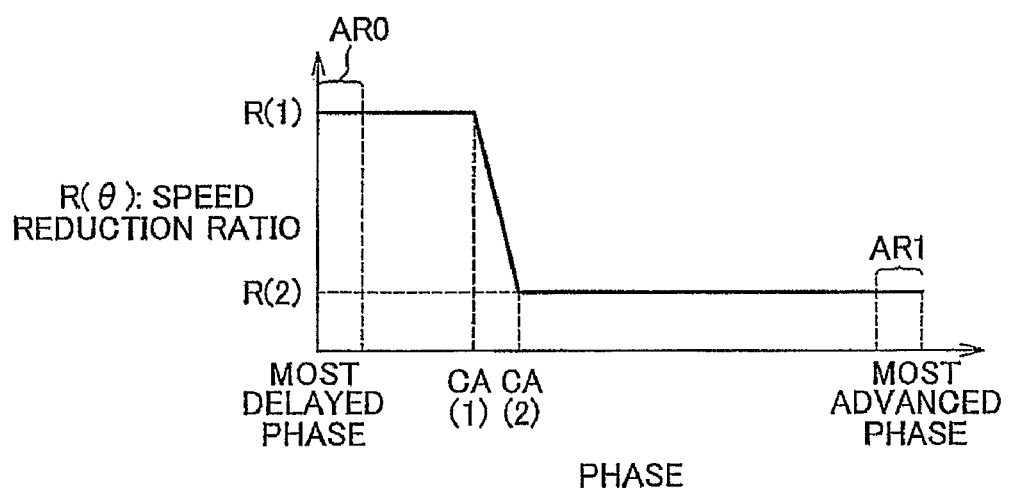
FIG. 9 is a graph showing the speed reduction ratio that the elements of the intake VVT mechanism realize in cooperation.

As shown in FIG. 9, the speed reduction ratio R (θ) that the elements of the intake VVT mechanism 2000 realize in cooperation, namely, the ratio of the relative rotational speed between the output shaft of the electric motor 2060 and the sprocket 2010 to the amount of change in the phase of the intake valve 1100 may take a value corresponding to the phase of the intake valve 1100. According to the embodiment of the invention, as the speed reduction ratio increases, the amount of change in the phase with respect to the relative rotational speed between the output shaft of the electric motor 2060 and the sprocket 2010 decreases.

When the phase of the intake valve 1100 is within the first region that extends from the most delayed phase to CA1, the speed reduction ratio that the elements of the intake VVT mechanism 2000 realize in cooperation is R1. When the phase of the intake valve 1100 is within the second region that extends from CA2 (CA2 is the phase more advanced than CA1) to the most advanced phase, the speed reduction ratio that the elements of the intake VVT mechanism 2000 realize in cooperation is R2 (R1>R2).

When the phase of the intake valve 1100 is within the third region that extends from CA1 to CA2, the speed reduction ratio that the elements of the intake VVT mechanism 2000 realize in cooperation changes at a predetermined rate ((R2−R1)/(CA2−CA1)).

The effects of the thus configured intake VVT mechanism 2000 of the variable valve timing system according to the embodiment of the invention will be described below.

Figure 10:
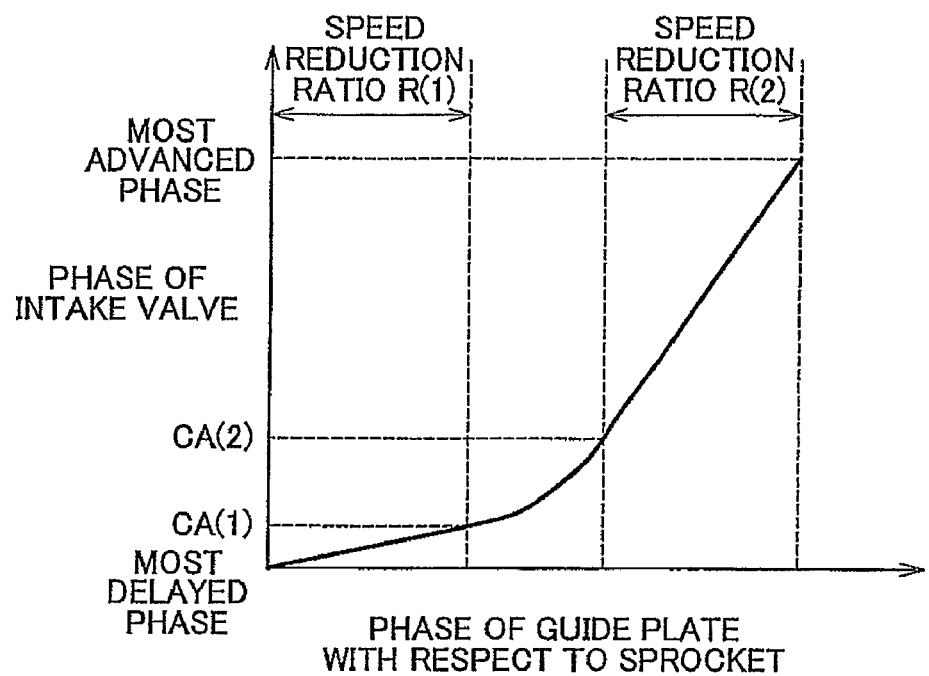
FIG. 10 is a graph showing the relationship between the phase of a guide plate relative to a sprocket and the phase of the intake camshaft.

When the phase of the intake valve 1100 (the intake camshaft 1120) is advanced, the electric motor 2060 is operated to rotate the guide plate 2040 relative to the sprocket 2010. As a result, the phase of the intake valve 1100 is advanced, as shown in FIG. 10.

When the phase of the intake valve 1100 is within the first region that extends from the most delayed phase to CA1, the relative rotational speed between the output shaft of the electric motor 2060 and the sprocket 2010 is reduced at the speed reduction ratio R1. As a result, the phase of the intake valve 1100 is advanced.

When the phase of the intake valve 1100 is within the second region that extends from CA2 to the most advanced phase, the relative rotational speed between the output shaft of the electric motor 2060 and the sprocket 2010 is reduced at the speed reduction ratio R2. As a result, the phase of the intake valve 1100 is advanced.

When the phase of the intake valve 1100 is delayed, the output shaft of the electric motor 2060 is rotated relative to the sprocket 2010 in the direction opposite to the direction in which the phase of the intake valve 1100 is advanced. When the phase is delayed, the relative rotational speed between the output shaft of the electric motor 2060 and the sprocket 2010 is reduced in the manner similar to that when the phase is advanced. When the phase of the intake valve 1100 is within the first region that extends from the most delayed phase to CA1, the relative rotational speed between the output shaft of the electric motor 2060 and the sprocket 2010 is reduced at the speed reduction ratio R1. As a result, the phase is delayed. When the phase of the intake valve 1100 is within the second region that extends from CA2 to the most advanced phase, the relative rotational speed between the output shaft of the electric motor 2060 and the sprocket 2010 is reduced at the speed reduction ratio R2. As a result, the phase is delayed.

Accordingly, as long as the direction of the relative rotation between the output shaft of the electric motor 2060 and the sprocket 2010 remains unchanged, the phase of the intake valve 1100 may be advanced or delayed in both the first region that extends from the most delayed phase to CA1 and the second region that extends from the CA2 to the most advanced phase. In this case, in the second region that extends from, CA2 to the most advanced phase, the phase is advanced or delayed by an amount larger than that in the first region that extends from the most delayed phase to CA1. Accordingly, the second region is broader in the phase change width than the first region.

In the first region that extends from the most delayed phase to CA1, the speed reduction ratio is high. Accordingly, a high torque is required to rotate the output shaft of the electric motor 2060 using the torque applied to the intake camshaft 1120 in accordance with the operation of the engine 1000. Therefore, even when the electric motor 2060 does not produce a torque, for example, even when the electric motor 2060 is not operating, the rotation of the output shaft of the electric motor 2060, which is caused by the torque applied to the intake camshaft 1120, is restricted. This restricts the deviation of the actual phase from the phase used in the control. In addition, occurrence of an undesirable phase change is restricted when the supply of electric power to the electric motor 2060 that serves as the actuator is stopped.

Preferably, the relationship between the direction in which the electric motor 2060 rotates relative to the sprocket 2010 and the advance/delay of the phase is set such that the phase of the intake valve 1100 is delayed when the output shaft of the electric motor 2060 is lower in rotational speed than the sprocket 2010. Thus, when the electric motor 2060 that serves as the actuator becomes inoperative while the engine is operating, the phase of the intake valve 1100 is gradually delayed, and finally agrees with the most delayed phase. Namely, even if the intake valve phase control becomes inexecutable, the phase of the intake valve 1100 is brought into a state in which combustion stably takes place in the engine 1000.

When the phase of the intake valve 1100 is within the third region that extends from CA1 to CA2, the relative rotational speed between the output shaft of the electric motor 2060 and the sprocket 2010 is reduced at the speed reduction ratio that changes at a predetermined rate. As a result, the phase of the intake valve 1100 is advanced or delayed.

When the phase of the intake valve 1100 is shifted from the first region to the second region, or from the second region to the first region, the amount of change in the phase with respect to the relative rotational speed between the output shaft of the electric motor 2060 and the sprocket 2010 is gradually increased or reduced. Accordingly, an abrupt stepwise change in the amount of change in the phase is restricted to restrict an abrupt change in the phase. As a result, the phase of the intake valve 1100 is controlled more appropriately.

As described so far, with the intake VVT mechanism 2000 of the variable valve timing system according to the embodiment of the invention, when the phase of the intake valve 1100 is within the first region that extends from the most delayed phase to CA1, the speed reduction ratio that the elements of the intake VVT mechanism 2000 realize in cooperation is R1.

When the phase of the intake valve 1100 is within the second region that extends from CA2 to the most advanced phase, the speed reduction ratio that the elements of the intake VVT mechanism 2000 realize in cooperation is R2 that is lower than R1. Accordingly, as long as the direction in which the output shaft of the electric motor 2060 remains unchanged, the phase of the intake valve 1100 may be advanced or delayed in both the first region that extends from the most delayed phase to CA1 and the second region that extends from the CA2 to the most advanced phase. In this case, in the second region that extends from CA2 to the most advanced phase, the phase is advanced or delayed by an amount larger than that in the first region that extends from the most delayed phase to CA1. Accordingly, the second region is broader in the phase change width than the first region. In the first region that extends from the most delayed phase to CA1, the speed reduction ratio is high. Accordingly, rotation of the output shaft of the electric motor 2060, which is caused by a torque applied to the intake camshaft 1120 in accordance with the operation of the engine, is restricted. This restricts the deviation of the actual phase from the phase used in the control. As a result, it is possible to change the phase in a broader range, and to control the phase more accurately.

In the intake VVT mechanism 2000, when the phase of the intake valve 1100 is most delayed or most advanced, the control pin 2034 reaches the end of the guide groove 2042, as shown in FIG. 7. Accordingly, in the region AR0 that is close to the most delayed phase and the region AR1 that is close to the most advanced phase, preferably, the rate of change in the phase of the intake valve 1100, namely, the operation of the electric motor 2060 that serves as the actuator is restricted by a larger amount than when the normal control is executed. In this way, an excessive shock is not caused when the control pin 2034 contacts the end of the guide groove 2042. As a result, the devices are protected from malfunctioning.

Next, the intake valve phase control executed by the variable valve timing system according to the embodiment of the invention will be described in detail.

Figure 11:
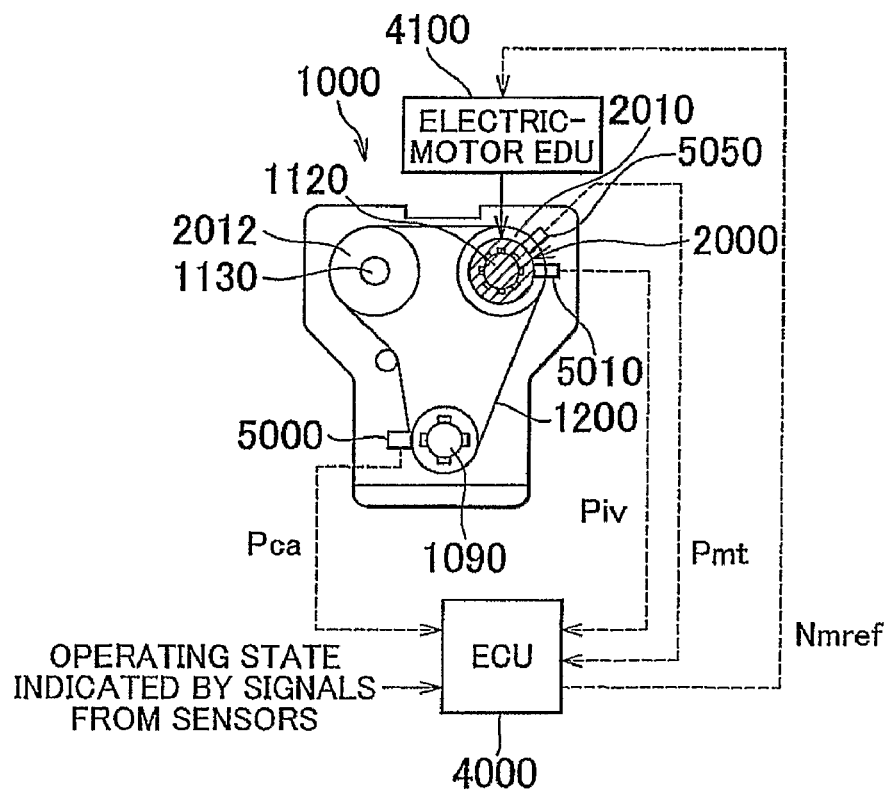
FIG. 11 is a schematic block diagram illustrating the configuration of the control over the phase of the intake valve, executed by the variable valve timing system according to the embodiment of the invention.

FIG. 11 is a schematic block diagram illustrating the configuration of the intake valve phase control executed by the variable valve timing system according to the embodiment of the invention.

As shown in FIG. 11, the engine 1000 is configured such that the power is transferred from the crank shaft 1090 to the intake camshaft 1120 and the exhaust camshaft 1130 via the sprocket 2010 and a sprocket 2012, respectively, by a timing chain 1200 (or a timing belt), as previously described with reference to FIG. 1. The camshaft position sensor 5010 that outputs a cam angle signal Piv each time the intake camshaft 1120 rotates by a predetermined cam angle is fitted on the outer periphery of the intake camshaft 1120. The crank angle sensor 5000 that outputs a crank angle signal Pca each time the crankshaft 1090 rotates by a predetermined crank angle is fitted on the outer periphery of the crankshaft 1090. The motor rotational angle sensor 5050 that outputs a motor rotational angle signal Pmt each time the electric motor 2060 rotates by a predetermined rotational angle is fitted to a rotor (not shown) of the electric motor 2060. These cam angle signal Piv, crank angle signal Pca and motor rotational angle signal Pmt are transmitted to the ECU 4000.

The ECU 4000 controls the operation of the engine 1000 based on the signals output from the sensors that detect the operating state of the engine 1000 and the operation conditions (the pedal operations performed by the driver, the current vehicle speed, etc.) such that the engine 1000 produces a required output power. As part of the engine control, the ECU 4000 sets the target value of the phase of the intake valve 1100 and the target value of the phase of the exhaust valve 1110 based on the map shown in FIG. 2. In addition, the ECU 4000 prepares the rotational speed command value Nmref for the electric motor 2060 that serves as the actuator of the intake VVT mechanism 2000. If the electric motor 2060 rotates at the rotational speed command value Nmref, the phase of the intake valve 1100 matches the target value (target phase). The rotational speed command value Nmref is set based on the relative rotational speed between the output shaft of the electric motor 2060 and the sprocket 2010 (the intake camshaft 1120), which corresponds to the operation amount of the actuator, as described in detail below.

The electric-motor EDU (Electronic Drive Unit) 4100 controls the rotational speed of the electric motor 2060 based on the rotational speed command value Nmref indicated by a signal from the ECU 4000.

Figure 12:
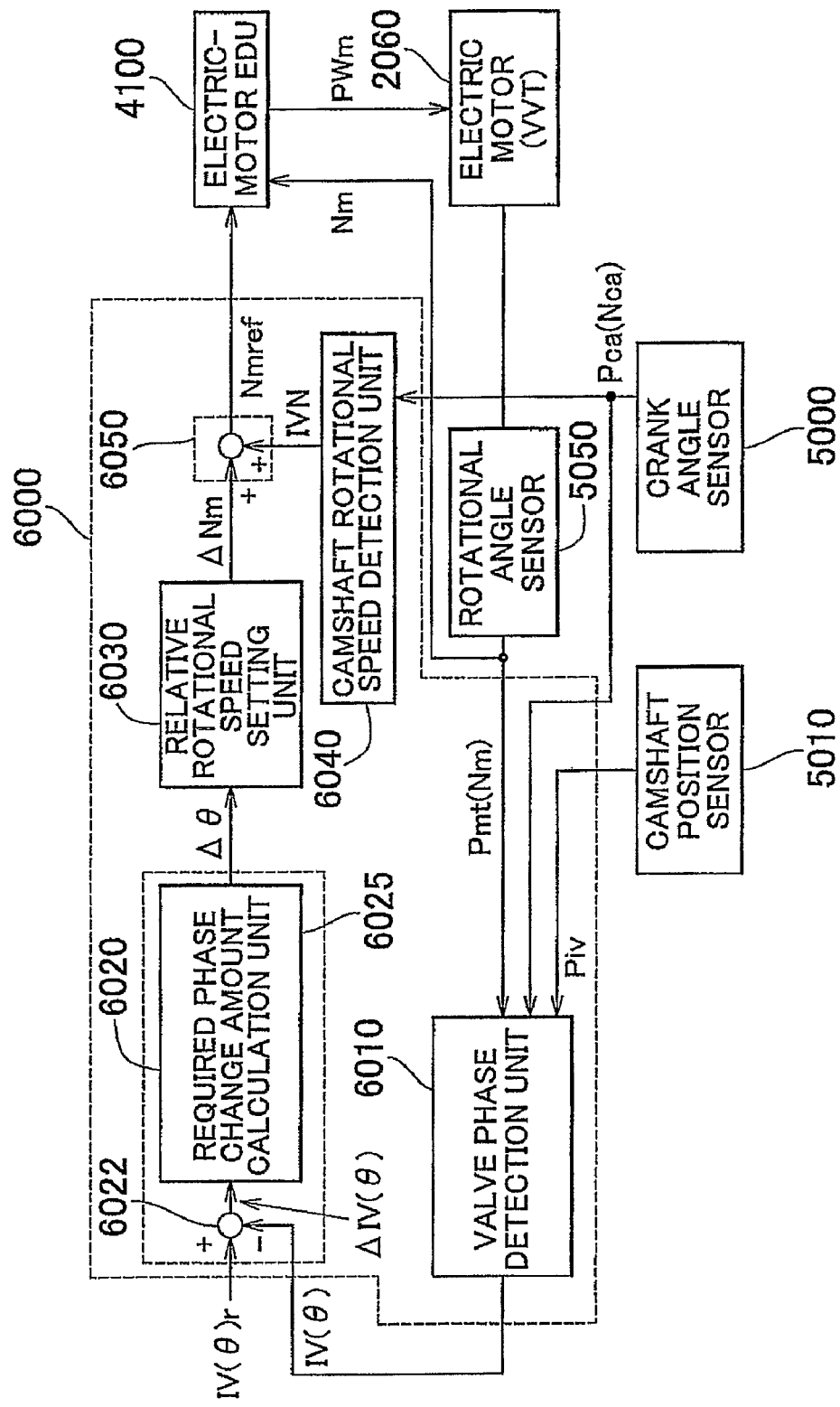
FIG. 12 is a block diagram illustrating the configuration of the control over the rotational speed of an electric motor that serves as an actuator of the variable valve timing system according to the embodiment of the invention.

FIG. 12 is a functional block diagram illustrating the motor speed control for executing the feedback control over the intake valve phase using the ECU 4000.

As shown in FIG. 12, an actuator operation amount setting unit 6000, which controls the phase of the intake valve 1100 in a feedback manner, includes a valve phase detection unit 6010; a camshaft phase change amount calculation unit 6020; a relative rotational speed setting unit 6030; a camshaft rotational speed detection unit 6040; and a rotational speed command value preparation unit 6050. The actuator operation amount setting unit 6000 corresponds to the functional block implemented by the ECU 4000. Usually, the function of the actuator operation amount setting unit 6000 is exhibited by executing the control routines according to a predetermined program stored in the ECU 4000 in advance in predetermined control cycles.

The valve phase detection unit 6010 calculates the current actual phase IV(θ) of the intake valve 1100 (hereinafter, referred to as the "actual intake valve phase IV(θ)) based on the crank angle signal Pca from the crank angle sensor 5000, the cam angle signal Piv from the camshaft position sensor 5010, and the motor rotational angle signal Pmt from the rotational angle sensor 5050 for the electric motor 2060.

The valve phase detection unit 6010 may calculate the current phase IV(θ) of the intake camshaft 1120 based on the crank angle signal Pca and the cam angle signal Piv. For example, the current valve phase IV(θ) is calculated, when the cam angle signal Piv is produced, by converting the time difference between the production of the cam angle signal Piv and the production of the crank angle signal Pca into the rotational phase difference between the crank shaft 1090 and the intake cam shaft 1120 (first phase calculation method).

Alternatively, with the intake VVT mechanism 2000 according to the embodiment of the invention, it is possible to accurately keep a track of the amount of change in the intake valve phase based on the operation amount (the relative rotational speed ΔNm) of the electric motor 2060 that serves as the actuator. More specifically, the actual relative rotational speed ΔNm is calculated based on the signals output from the sensors, and the amount of the change dIV(θ) in the intake valve phase per unit time (during one control cycle) is then calculated by the calculation process based on the calculated actual relative rotational speed ΔNm. Accordingly, the valve phase detection unit 6010 may successively calculate the current phase IV(θ) of the intake camshaft 1120 by accumulating the phase change amounts dIV(θ) (second phase calculation method). The valve phase detection unit 6010 may calculate the current valve phase IV(θ) by appropriately using the first phase calculation method or the second phase calculation method in consideration of, for example, the stability of the engine speed and the calculation load on the ECU.

The camshaft phase change amount calculation unit 6020 includes a calculation unit 6022 and a required phase change amount calculation unit 6025. The calculation unit 6022 calculates the deviation ΔIV(θ) (ΔIV(θ)=IV(θ)−IV(θ)r) of the actual intake valve phase IV(θ) from the target phase IV(θ)r. The required phase change amount calculation unit 6025 calculates the amount Δθ by which the phase of the intake camshaft 1120 is required to change (hereinafter, referred to as the "required phase change amount Δθ for the intake camshaft 1120") in the current control cycle based on the deviation ΔIV(θ) calculated by the calculation unit 6022.

For example, the maximum value of the required phase change amount Δθ in a single control cycle is set in advance. The required phase change amount calculation unit 6025 sets the required phase change amount Δθ, which corresponds to the deviation ΔIV(θ) and which is equal to or smaller than the maximum value. The maximum value may be a fixed value. Alternatively, the maximum value may be variably set by the required phase change amount calculation unit 6025 based on the operating state of the engine 1000 (the engine speed, the intake air amount, etc.) and the deviation ΔIV(θ) of the actual intake valve phase. IV(θ) from the target phase IV(θ)r.

The relative rotational speed setting unit 6030 calculates the rotational speed ΔNm of the output shaft of the electric motor 2060 relative to the rotational speed of the sprocket 2010 (the intake camshaft 1120). The relative rotational speed ΔNm needs to be achieved in order to obtain the required phase change amount Δθ calculated by the required phase change amount calculation unit 6025. For example, the relative rotational speed ΔNm is set to a positive value (ΔNm>0) when the phase of the intake valve 1100 is advanced. On the other hand, when the phase of the intake valve 1100 is delayed, the relative rotational speed ΔNm is set to a negative value (ΔNm<0). When the current phase of the intake valve 1100 is maintained (Δθ=0), the relative rotational speed ΔNm is set to a value substantially equal to zero (ΔNm=0).

The relationship between the required phase change amount Δθ per unit time ΔT corresponding to one control cycle and the relative rotational speed ΔNm is expressed by Equation 1 shown below. In Equation 1, R(θ) is the speed reduction ratio that changes in accordance with the phase of the intake valve 1100, as shown in FIG. 9.

$$\Delta\theta \propto \Delta Nm \times 360° \times (1/R(\theta)) \times \Delta T \qquad \text{Equation 1}$$

According to Equation 1, the relative rotational speed setting unit 6030 calculates the rotational speed ΔNm of the electric motor 2060 relative to the rotational speed of the sprocket 2010, the relative rotational speed ΔNm being required to be achieved to obtain the required phase change amount Δθ for the camshaft during the control cycle ΔT.

The camshaft rotational speed detection unit 6040 calculates the rotational speed of the sprocket 2010, namely, the actual rotational speed IVN of the intake camshaft 1120 by dividing the rotational speed of the crankshaft 1090 by two. Alternatively, the camshaft rotational speed detection unit 6040 may calculate the actual rotational speed IVN of the intake camshaft 1120 based on the cam angle signal Piv from the camshaft position sensor 5010. Generally, the number of cam angle signals output during one rotation of the intake camshaft 1120 is smaller than the number of crank angle signals output during one rotation of the crankshaft 1090. Accordingly, the accuracy of detection is enhanced by detecting the camshaft rotational speed IVN based on the rotational speed of the crankshaft 1090.

The rotational speed command value preparation unit 6050 prepares the rotational speed command value Nmref for the electric motor 2060 by adding the actual rotational speed IVN of the intake camshaft 1120, which is calculated by the camshaft rotational speed detection unit 6040, to the relative rotational speed ΔNm set by the relative rotational speed setting unit 6030. A signal indicating the rotational speed command value Nmref prepared by the rotational speed command value preparation unit 6050 is transmitted to the electric-motor EDU 4100. Thus, the feedback control loop for the intake valve phase is formed.

The electric-motor EDU 4100 executes the rotational speed control such that the rotational speed of the electric motor 2060 matches the rotational speed command value Nmref. For example, the electric-motor EDU 4100 controls the on/off state of a power semiconductor element (e.g. a transistor) to control the electric power supplied to the electric motor 2060 (typically, the magnitude of electric current passing through the electric motor and the amplitude of the voltage applied to the electric motor) based on the deviation (Nmref−Nm) of the actual rotational speed Nm of the electric motor 2060 from the rotational speed command value Nmref. For example, the duty ratio used in the on/off operation of the power semiconductor element is controlled.

In order to control the electric motor 2060 more efficiently, the electric-motor EDU 4100 controls the duty ratio DTY that is the adjustment amount by which the electric power supplied to the electric motor 2060 is controlled, according to Equation 2 shown below.

$$DTY=DTY(ST)+DTY(FB) \qquad \text{Equation 2}$$

In Equation 2, DTY(FB) is a feedback term based on the control calculation using the above-described deviation and a predetermined control gain (typically, common P control or PI control).

Figure 13:
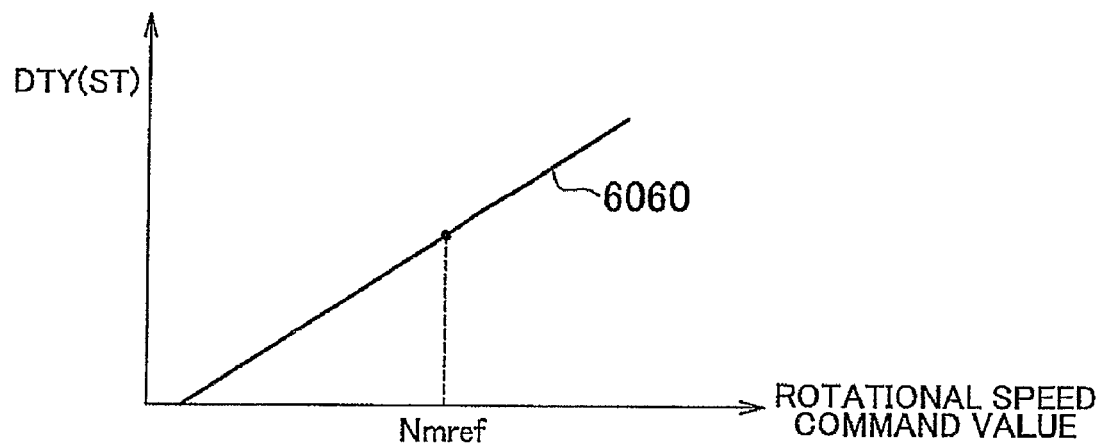
FIG. 13 is a graph illustrating the control over the rotational speed of the electric motor.

DTY(ST) in Equation 2 is a preset term that is set based on the rotational speed command value Nmref for the electric motor 2060 and the set relative rotational speed ΔNm, as shown in FIG. 13.

FIG. 13 is a graph illustrating the control over the rotational speed of the electric motor 2060. As shown in FIG. 13, a duty ratio characteristic 6060 corresponding to the motor current value required when the relative rotational speed ΔNm is zero (ΔNm=0), namely, when the electric motor 2060 is rotated at the same rotational speed as the sprocket 2010 based on the rotational speed command value Nmref is presented in a table in advance. DTY(ST) in Equation 2 is set based on the duty ratio characteristic 6060.

The rotational speed control, in which the electric power supplied to the electric motor 2060 is controlled using both the preset term and the feedback term in combination, is executed. In this way, the electric-motor EDU 4100 causes the rotational speed of the electric motor 2060 to match the rotational speed command value Nmref, even if it changes, more promptly than in a simple feedback control, namely, the rotational speed control in which the electric power supplied to the electric motor 2060 is controlled using only the feedback term DTY(FB) in Equation 2.

Next, the control modes for the variable valve timing system according to the embodiment of the invention will be described. As the control modes for the variable valve timing system, in addition to the "rotational speed control mode (S120)" described above, the "constant electric power control mode" is used. In the rotational speed control mode, the rotational speed command value for the electric motor 2060 is successively prepared in order to execute the feedback control in which the intake valve phase is changed in accordance with the target phase. In the constant electric power control mode, the electric power supplied to the electric motor 2060 is restricted by fixing the duty ratio DTY to a predetermined value such that the rate of change in the intake valve phase is restricted. The constant electric power control mode is selected when a predetermined condition is satisfied.

Figure 14:
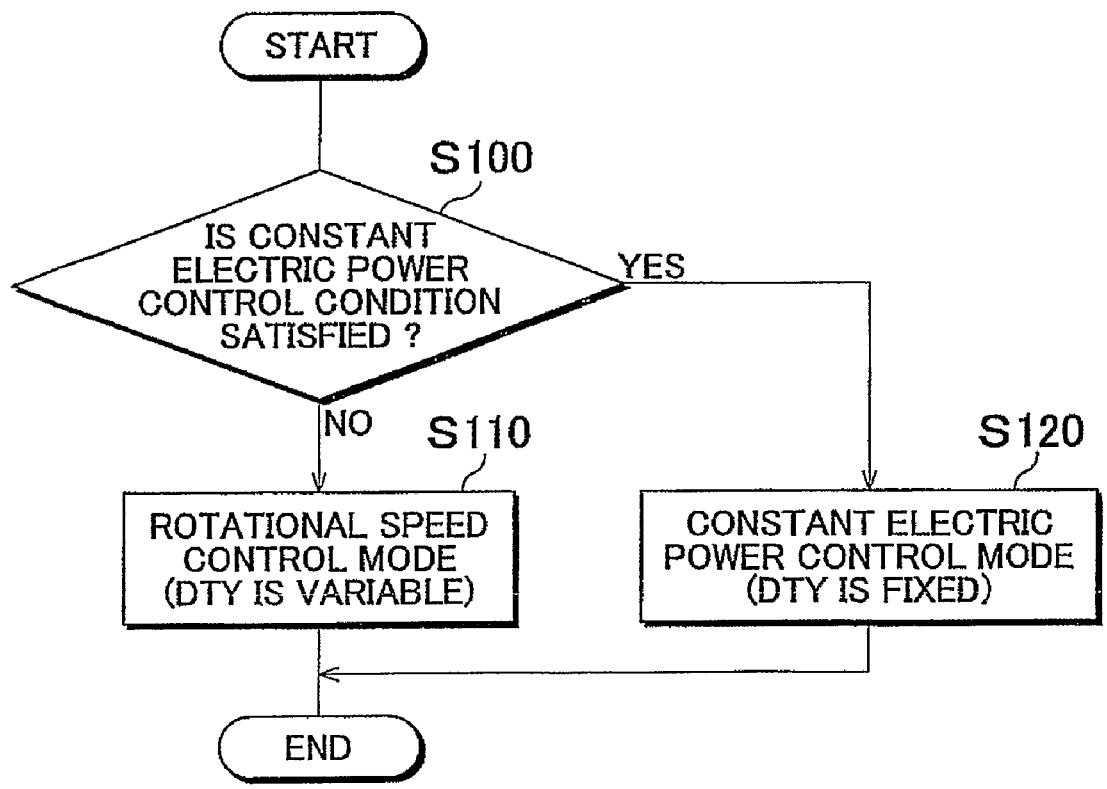
FIG. 14 is a flowchart illustrating the manner in which the control mode is selected in the variable valve timing system according to the embodiment of the invention.

As shown in FIG. 14, the ECU 4000 determines in step S100 whether a predetermined constant electric power control condition, under which the constant electric power control mode needs to be selected, is satisfied. Typically, the constant electric power control condition is satisfied when the current intake valve phase is within the region AR0 (FIG. 9) that is close to the most delayed phase or the region AR1 (FIG. 9) that is close to the most advanced phase. Preferably, the constant electric power control condition is satisfied when it is considered that the intake valve phase is not detected as accurately as it should be, for example, when the reference position learning concerning the intake valve phase is not executed properly.

When it is determined that the constant electric power control condition is not satisfied ("NO" in step S100), the ECU 4000 selects the rotational speed control mode that is the normal control mode. As described above, in the rotational speed control mode, the duty ratio DTY, based on which the electric power supplied to the electric motor 2060 is controlled, is variable, and the rate of phase change is maintained at a sufficient level in order to allow the intake valve phase to respond to the control promptly.

On the other hand, when the constant electric power control condition is satisfied ("YES" in step S100), the ECU 4000 selects the constant electric power control mode in step S120. In the constant electric power control mode, the duty ratio DTY is fixed to the predetermined value DTYf, whereby the electric power supplied to the electric motor 2060 is restricted. The predetermined value DTYf may be obtained in advance by, for example, an experiment such that an excessive shock is not caused when the control pin 2034 contacts the end of the guide groove 2042. In this way, the devices are protected from malfunctioning.

Figure 15:
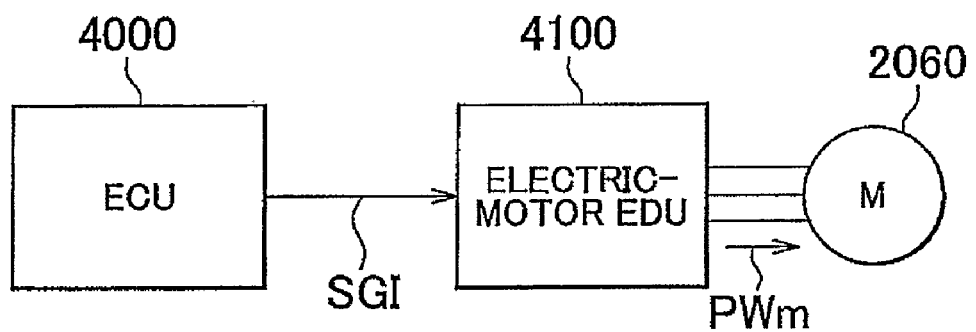
FIG. 15 is a block diagram illustrating the connection between an ECU and an electric-motor EDU.

As shown in FIG. 15, the operation command signal SGI that is transmitted from the ECU 4000 to the electric-motor EDU 4100 needs to indicate, as the operation commands, both the information indicating which of the rotational speed control mode and the constant electric power control mode is selected as the control mode, and the information indicating the direction in which the electric motor 2060 should be rotated (whether the electric motor 2060 should be rotated in the forward direction or the reverse direction). In addition, in the rotational speed control mode, the operation command signal SGI needs to indicate the information concerning the rotational speed command value Nmref for the electric motor 2060.

In the rotational speed control mode, the electric-motor EDU 4100 variably controls the electric power PWm supplied to the electric motor 2060 such that the rotational speed of the electric motor 2060 matches the rotational speed command value Nmref. In the constant electric power control mode, the electric power PWm supplied to the electric motor 2060 is controlled to the constant value corresponding to the predetermined duty ratio DTYf.

Figure 16:
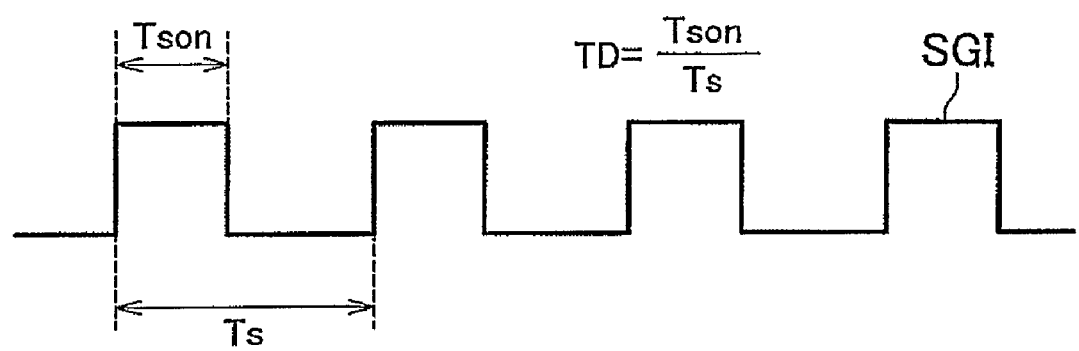
FIG. 16 is a waveform chart illustrating an operation command signal transmitted from the ECU to the electric-motor EDU.

As shown in FIG. 16, the ECU 4000 sets the frequency (a cycle Ts) of the operation command signal SGI, which is a pulse signal, based on the rotational speed command value Nmref. In addition, the ECU 4000 sets the duty ratio TD (TD=Ton/Ts) of the pulse signal, which is the ratio of the period in which the pulse signal is on to one cycle Ts, based on the combination of the control mode and the direction in which the electric motor 2060 should be rotated (whether the electric motor 2060 should be rotated in the forward direction or the reverse direction).

As shown in FIG. 17, the duty ratio TD is set to one of the predetermined values TD1 to TD4 based on the combination of the control mode and the direction in which the electric motor 2060 should be rotated. In the case in which the electric motor 2060 should be rotated in the forward direction, the duty ratio TD is set to the predetermined value DT1 (for example, 10%) when the rotational speed control mode is selected. When the constant electric power control mode is selected, the duty ratio TD is set to the predetermined value DT2 (for example, 35%). In the case in which the electric motor 2060 should be rotated in the reverse direction, the duty ratio TD is set to the predetermined value DT3 (for example, 65%), when the constant electric power control mode is selected. When the rotational speed control mode is selected, the duty ratio TD is set to the predetermined value DT4 (for example, 90%).

These predetermined values DT1 to DT4 are set such that the following conditions are satisfied. First, the predetermined values DT1 and DT2, which are selected when the electric motor 2060 should be rotated in the forward direction, are set to be on one of the higher side and the lower side with respect to the boundary value, while the predetermined values DT3 and DT4, which are selected when the electric motor 2060 should be rotated in the reverse direction, are set to be on the other of the higher side and the lower side with respect to the boundary value. In the example shown in FIG. 17, the boundary value is 50% (boundary value=50%), the predetermined values DT1 and DT2 are higher than 50% (DT1, DT2>50%), and the predetermined values DT3 and DT4 are lower than 50% (DT3, DT4<50%).

In the case in which the electric motor 2060 should be rotated in the forward direction, the difference between the boundary value and the predetermined value DT1, which is selected when the control mode is the rotational speed control mode in which the rate of change in the intake valve phase is relatively high, is larger than the difference between the boundary value and the predetermined value DT2, which is selected when the control mode is the constant electric power control mode. Similarly, in the case in which the electric motor should be rotated in the reverse direction, the difference between the boundary value and the predetermined value DT4, which is selected when the control mode is the rotational speed control mode in which the rate of change in the intake valve phase is relatively high, is larger than the difference between the boundary value and the predetermined value DT3 selected when the control mode is the constant electric power control mode.

Thus, the predetermined values used when the electric motor 2060 should be rotated in one of the directions are on one of the higher side and the lower side with respect to the boundary value, and the predetermined values used when the electric motor 2060 should be rotated in the other direction are on the other of the higher side and the lower side with respect to the boundary value. In addition, the predetermined values closer to the boundary value indicate the constant electric power control mode in which the rate of change in the intake valve phase is relatively low. Accordingly, even when the electric-motor EDU 4100 (a duty ratio detection circuit 4200) falsely recognizes the duty ratio near the boundary value, it is possible to prevent the intake valve phase from abruptly changing in an undesirable direction.

The difference between the boundary value and each of the predetermined values DT2 and DT3 is the smallest among the differences between the boundary value and the predetermined values DT1 to DT4. The difference (30%) between these predetermined values DT2 and DT3 is larger than the difference (25%) between the predetermined values DT1 and DT2 that are selected when the electric motor 2060 should be rotated in the forward direction, and the difference (25%) between the predetermined values DT3 and DT4 that are selected when the electric motor 2060 should be rotated in the reverse direction. Thus, it is possible to more accurately prevent a false recognition concerning the direction in which the electric motor 2060 should be rotated.

Figure 18:
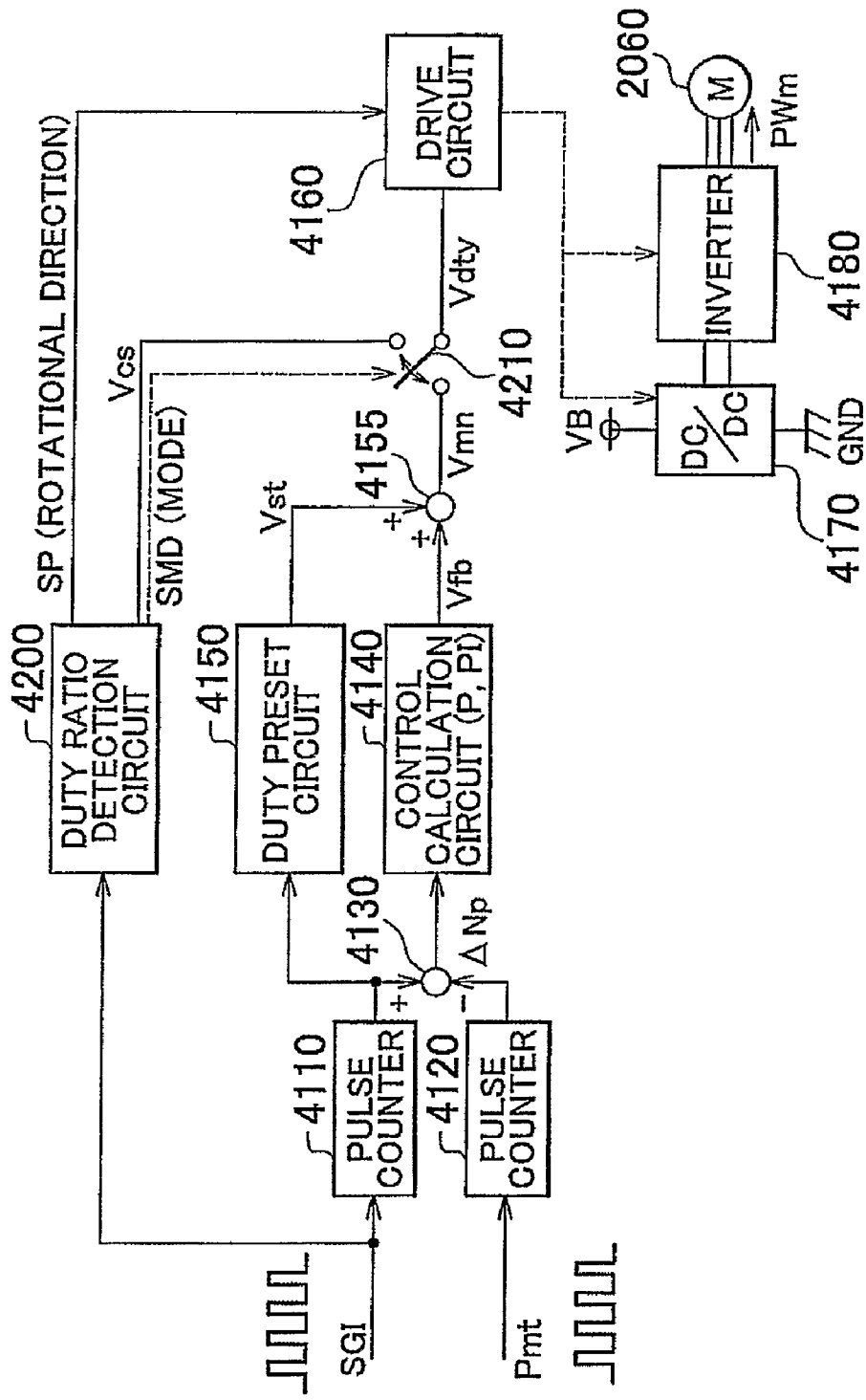
FIG. 18 is a functional block diagram illustrating the configuration of the electric-motor EDU.

FIG. 18 is a functional block diagram illustrating the configuration of the electric-motor EDU 4100. As shown in FIG. 18, the electric-motor EDU 4100 includes pulse counters 4110 and 4120, a subtraction circuit 4130, a control calculation circuit 4140, a duty preset circuit 4150, an addition circuit 4155, a drive circuit 4160, a DC/DC converter 4170, an inverter 4180, the duty ratio detection circuit 4200, and a changeover switch 4210.

The pulse counter 4110 counts the number of pulses of the operation command signal SG1 from the ECU 4000. As described above, the operation command signal SG1 has a frequency corresponding to the rotational speed command value Nmref. The pulse counter 4120 counts the number of pulses of the motor rotational angle signal Pmt. The subtraction circuit 4130 outputs a signal indicating the difference ΔNp between the number of pulses counted by the pulse counter 4110 and the number of pulses counted by the pulse counter 4120. Namely, the signal output from the subtraction circuit 4130 corresponds to the deviation of the rotational speed of the electric motor 2060 from the rotational speed command value Nmref.

The control calculation circuit 4140 outputs a signal indicating the adjustment amount based on the deviation of the rotational speed of the electric motor 2060 from the rotational speed command value Nmref, namely, the control voltage Vfb that indicates the feedback term DTY(FB) in Equation 2 according to a known control calculation method, for example, P control or PI control. The duty preset circuit 4150 outputs a signal indicating the control voltage Vst that indicates the preset term DTY in Equation 2 based on the duty ratio characteristic 6060 shown in FIG. 13, according to the signal output from the pulse counter 4110.

The addition circuit 4155 outputs a signal indicating the control voltage Vmn that is the sum of the control voltage Vfb indicated by the signal from the control calculation circuit 4140 and the control voltage Vst indicated by the signal from the duty preset circuit 4150. The control voltage Vmn corresponds to the duty ratio DTY in Equation 2, and indicates the duty ratio of the power semiconductor element in the DC/DC converter 4170 in the rotational speed control mode.

The duty ratio detection circuit 4200 detects the duty ratio TD of the operation command signal SG1, and determines which of the predetermined values DT1 to DT4 shown in FIG. 17 the detected duty ratio corresponds to. Based on the result of determination, the duty ratio detection circuit 4200 prepares the control signal SP indicating whether the electric motor 2060 should be rotated in the forward direction or in the reverse direction, and the control signal SMD indicating the selected control mode.

Based on the control signal SMD from the duty ratio detection circuit 4200, when the rotational speed control mode is selected, the changeover switch 4210 uses the control voltage Vmn indicated by a signal from the addition circuit 4155 as the control voltage Vdty, and transmits a signal indicating the control voltage Vmn to the drive circuit 4160. When the constant electric power control mode is selected, the changeover switch 4210 uses the voltage Vcs corresponding to the fixed duty ratio DTYf as the control voltage Vdty, and transmits a signal indicating the voltage Vcs to the drive circuit 4160.

The DC/DC converter 4170 is formed of, for example, a chopper circuit. The source voltage VB is stepped up or stepped down in accordance with the duty ratio of the power semiconductor element in the circuit. Accordingly, the output voltage Vac from the DC/DC converter 4170 is variably controlled in accordance with the duty ratio DTY indicated by the control voltage Vdty.

The inverter 4180 is formed of, for example, a common three-phase inverter, and applies an alternating-current voltage of which the peak amplitude matches the output voltage Vac from the DC/DC converter 4170. When the electric motor 2060 rotates in the reverse direction, the inverter 4180 applies the alternating-current voltage of which the phase is reversed from the phase when the electric motor 2060 rotates in the forward direction in accordance with the control signal SP from the duty ratio detection circuit 4200.

With this configuration, the electric-motor EDU 4100 executes the control based on the direction in which the electric motor should be rotated, the control mode, and the rotational speed command value, which are indicated by the operation command signal SGI. When the rotational speed control mode is selected, the electric-motor EDU 4100 executes the rotational speed feedback control based on the rotational speed command value Nmref. When the constant electric power control mode is selected, the electric-motor EDU 4100 fixes the electric power supplied to the electric motor (the motor voltage) to the predetermined value such that the rate of change in the intake valve phase is restricted.

As described so far, the operation command signal SGI contains multiple operation command items such as the control mode, the direction in which the electric motor 2060 should be rotated, and the rotational speed command value Nmref used when the rotational speed control mode is selected. In addition, the duty ratio of the operation command signal SGI is set based on the combination of the control mode and the direction in which the electric motor 2060 should be rotated such that, even when the electric-motor EDU 4100 falsely recognizes the duty ratio of the operation command signal SGI, the negative influence on the intake valve phase control is minimized. As described above, the ECU 4000 appropriately sets the operation command signal SGI which is used to indicate the operation of the electric motor 2060 that serves as the actuator, and transmits the operation command signal SGI to the electric-motor EDU 4100. In this way, the valve timing control is executed more stably.

In above description concerning the embodiment of the invention, the "rotational speed control mode" and the "constant electric power control mode" are used as the control modes. However, this is just an example. The embodiment of the invention may be applied in the case where which of the multiple modes that are different in the rate of change in the intake valve phase should be selected is commanded. Also, the actuator is not limited to the electric motor. More specifically, the invention may be applied to any control configurations as long as the duty ratio of the operation command signal indicates the combination of the direction in which the actuator should be operated and the mode selected from among the multiple modes that are different in the rate of change in the intake valve phase.

In the embodiment of the invention described above, the ECU 4000 and the electric-motor EDU 4100 may be regarded as a "control unit" and a "drive control unit" according to the invention, respectively, and the operation command signal SGI may be regarded as a "pulsed operation command signal" according to the invention. The rotational speed control mode may be regarded as a "first control mode" according to the invention, and the constant electric power control mode may be regarded as a "second control mode" according to the invention. The predetermined values DT1 to DT4 may be regarded as "predetermined values" according to the invention. More specifically, the predetermined values DT1 to DT4 may be regarded as "first to fourth values" according to the invention.

The embodiment of the invention that has been disclosed in the specification is to be considered in all respects as illustrative and not restrictive. The technical scope of the invention is defined by claims, and all changes which come within the meaning and range of equivalency of the claims are therefore intended to be embraced therein.

The invention claimed is:

1. A variable valve timing system that changes opening/closing timing of at least one of an intake valve and an exhaust valve provided in an engine, comprising:
   a changing mechanism that is structured to change the opening/closing timing of the intake valve or the exhaust valve by an amount of change corresponding to an operation amount of an actuator that is driven in a control mode selected from among multiple control modes;
   a control unit that prepares operation commands for the actuator based on a current value of the opening/closing timing, and that prepares a pulsed operation command signal which indicates, among the prepared operation commands, at least both which operating direction the actuator should be operated and the selected control mode; and
   a drive control unit that receives the pulsed operation command signal from the control unit, and that controls the actuator in accordance with the operation commands prepared by the control unit, wherein the control unit sets a duty ratio of the pulsed operation command signal to a predetermined value assigned to a corresponding one of multiple combinations of the operating direction and the selected control mode, the multiple combinations being assigned with different predetermined values; and the predetermined values assigned to the corresponding multiple combinations of the multiple control modes and one of the operating directions are higher than a boundary value, and the predetermined values assigned to the corresponding multiple combinations of the multiple control modes and the other operating direction are lower than the boundary value; and among the predetermined values corresponding to each of the operating directions, a difference between the boundary value and the predetermined value, which is assigned to one of the control modes is larger than a difference between the boundary value and the predetermined value, which is assigned to another one of the control modes in which a rate of change in the opening/closing timing is lower than that in the one of the control modes.

2. The variable valve timing system according to claim 1, wherein a difference between the predetermined value, which is closest to the boundary value from among the predetermined values that are higher than the boundary value, and the predetermined value, which is closest to the boundary value from among the predetermined values that are lower than the boundary value, is larger than a difference between the predetermined values that are adjacent to each other when the predetermined values, which correspond to each of the operating directions and are assigned to the corresponding multiple control modes, are sorted in ascending order.

3. The variable valve timing system according to claim 2, wherein an electric motor is used as the actuator, the operation amount of the actuator is a rotational speed of the electric motor relative to a rotational speed of a camshaft that drives the valve of which the opening/closing timing is changed, and the direction in which the actuator should be operated is a direction in which the electric motor should be rotated, the multiple control modes includes a first control mode in which a rotational speed control over the electric motor is executed, and a second control mode in which electric power supplied to the electric motor is fixed in order to restrict the rate of change in the opening/closing timing, in a case in which a command to rotate the electric motor in a forward direction is issued, the duty ratio is set to a first value when the first control mode is selected, and the duty ratio is set to a second value when the second control mode is selected, in a case in which a command to rotate the electric motor in a reverse direction is issued, the duty ratio is set to a third value when the second control mode is selected, and the duty ratio is set to a fourth value when the first control mode is selected, and a difference between the first value and the boundary value is larger than a difference between the second value and the boundary value, and a difference between the fourth value and the boundary value is larger than a difference between the third value and the boundary value.

4. The variable valve timing system according to claim 3, wherein a difference between the second value and the third value is larger than a difference between the first value and the second value, and the difference between the second value and the third value is larger than a difference between the third value and the fourth value.

5. The variable valve timing system according to claim 1, wherein an electric motor is used as the actuator, the operation amount of the actuator is a rotational speed of the electric motor relative to a rotational speed of a camshaft that drives the valve of which the opening/closing timing is changed, and the direction in which the actuator should be operated is a direction in which the electric motor should be rotated, the multiple control modes includes a first control mode in which a rotational speed control over the electric motor is executed, and a second control mode in which electric power supplied to the electric motor is fixed in order to restrict the rate of change in the opening/closing timing, in a case in which a command to rotate the electric motor in a forward direction is issued, the duty ratio is set to a first value when the first control mode is selected, and the duty ratio is set to a second value when the second control mode is selected, in a case in which a command to rotate the electric motor in a reverse direction is issued, the duty ratio is set to a third value when the second control mode is selected, and the duty ratio is set to a fourth value when the first control mode is selected, and a difference between the first value and the boundary value is larger than a difference between the second value and the boundary value, and a difference between the fourth value and the boundary value is larger than a difference between the third value and the boundary value.

6. The variable valve timing system according to claim 5, wherein a difference between the second value and the third value is larger than a difference between the first value and the second value, and the difference between the second value and the third value is larger than a difference between the third value and the fourth value.

7. The variable valve timing system according to claim 1, wherein the pulsed operation command signal indicates the operation amount of the actuator in addition to the direction in which the actuator should be operated and the selected control mode, and the control unit sets a frequency of the pulsed operation command signal in accordance with an operation amount command value for the actuator, based on a predetermined relationship between the operation amount of the actuator and the frequency of the pulsed operation command signal.

8. The variable valve timing system according to claim 7, wherein an electric motor is used as the actuator, and the operation amount of the actuator is a rotational speed of the electric motor relative to a rotational speed of a camshaft that drives the valve of which the opening/closing timing is changed, and the control unit sets the frequency of the pulsed operation command signal in accordance with a rotational speed command value for the electric motor, based on a predetermined relationship between the rotational speed of the electric motor and the frequency of the pulsed operation command signal.

\* \* \* \* \*